(12) United States Patent
Kobayashi et al.

(10) Patent No.: US 11,475,918 B2
(45) Date of Patent: Oct. 18, 2022

(54) RECORDING STATE EVALUATION METHOD, RECORDING COMPENSATION METHOD, AND INFORMATION RECORDING/PLAYBACK DEVICE

(71) Applicant: Panasonic Intellectual Property Management Co., Ltd., Osaka (JP)

(72) Inventors: Yasushi Kobayashi, Osaka (JP); Kohei Nakata, Nara (JP); Yasumori Hino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/487,303

(22) Filed: Sep. 28, 2021

(65) Prior Publication Data
US 2022/0013144 A1    Jan. 13, 2022

Related U.S. Application Data

(63) Continuation of application No. PCT/JP2020/003817, filed on Jan. 31, 2020.

(30) Foreign Application Priority Data

Mar. 29, 2019  (JP) .............................. JP2019-066587

(51) Int. Cl.
*G11B 27/24* (2006.01)
*G11B 20/10* (2006.01)
*G11B 7/0045* (2006.01)

(52) U.S. Cl.
CPC ...... *G11B 20/10314* (2013.01); *G11B 7/0045* (2013.01); *G11B 20/10388* (2013.01)

(58) Field of Classification Search
CPC ... G11B 7/00736; G11B 19/12; G11B 7/1263; G11B 7/1267; G11B 20/10305;
(Continued)

(56) References Cited

U.S. PATENT DOCUMENTS 8,228,771 B2 * 7/2012 Himi .................... G11B 20/182
369/53.31
2009/0225639 A1   9/2009 Miyashita et al.
(Continued)

FOREIGN PATENT DOCUMENTS

JP    2004-310922    11/2004
JP    2011-23069     2/2011
(Continued)

OTHER PUBLICATIONS

International Search Report dated Apr. 21, 2020 in International (PCT) Application No. PCT/JP2020/003817.

*Primary Examiner* — Nabil Z Hindi
(74) *Attorney, Agent, or Firm* — Wenderoth, Lind & Ponack, L.L.P.

(57) ABSTRACT

A recording mark is formed on a recording medium by a predetermined recording signal, a playback signal of the recording mark formed on the recording medium is obtained, and an expected value signal of the playback signal based on the recording signal is generated. Based on an amplitude error between the playback signal and the expected value signal, and for each predetermined unit of the recording signal, a deviation amount of a mark shape of the recording mark from which the playback signal is obtained with respect to a mark shape of an ideal recording mark is calculated, and a mark shape of the recording mark formed on the recording medium is estimated. Based on the deviation amount of the mark shape of the recording mark, a correction amount is calculated for each predetermined unit
(Continued)

of the recording signal, and a level of the recording signal is adjusted.

9 Claims, 10 Drawing Sheets

(58) Field of Classification Search
CPC ... G11B 20/10203; G11B 7/126; G11B 27/24; G11B 27/3027; G11B 7/00456; G11B 20/10027
USPC .................. 369/53.22, 116, 53.35, 59.17
See application file for complete search history.

(56) References Cited

U.S. PATENT DOCUMENTS

| | | |
|---|---|---|
| 2011/0026383 A1 | 2/2011 | Minemura et al. |
| 2011/0149704 A1 | 6/2011 | Miyashita et al. |
| 2013/0215731 A1 | 8/2013 | Takaoka et al. |
| 2018/0330752 A1 | 11/2018 | Fujiki |

FOREIGN PATENT DOCUMENTS

| | | |
|---|---|---|
| WO | 2009/107399 | 9/2009 |
| WO | 2012/124313 | 9/2012 |
| WO | 2017/126330 | 7/2017 |

* cited by examiner

*FIG. 8*

| PATTERN | PRECEDING SPACE | TARGET MARK | SUCCEEDING SPACE |
|---|---|---|---|
| P(1) | 2T | BEFORE 2T | 2T |
| P(2) | | AFTER 2T | |
| P(3) | 3T | BEFORE 2T | 2T |
| P(4) | | AFTER 2T | |
| P(5) | 4T | BEFORE 2T | 2T |
| P(6) | | AFTER 2T | |
| P(7) | 5T OR MORE | BEFORE 2T | 2T |
| P(8) | | AFTER 2T | |
| ⋮ | ⋮ | ⋮ | ⋮ |

RECORDING STATE EVALUATION METHOD, RECORDING COMPENSATION METHOD, AND INFORMATION RECORDING/PLAYBACK DEVICE

CROSS-REFERENCE TO RELATED APPLICATIONS

This is a continuation of International Application No. PCT/JP2020/003817 filed on Jan. 31, 2020, and claims priority from Japanese Patent Application No. 2019-066587 filed on Mar. 29, 2019, the entire content of which is incorporated herein by reference.

TECHNICAL FIELD

The present disclosure relates to a recording state evaluation method, a recording compensation method, and an information recording/playback device when optically recording information on a recording medium.

BACKGROUND ART

In the related art, as a recording medium for optically performing information recording, there are BD-R, BD-RE, DVD-RAM, DVD-R, DVD-RW, CD-RW standards, and the like for an optical disc, and there is a technique of recording information by additionally writing or rewriting information by radiating laser light to a recording medium conforming to these standards. Further, in recent years, a technique of performing recording on an optical disc having a higher density than that of a Blu-ray (registered trademark) disc (BD) has been studied. The BD is a high-density optical disc having a recording capacity of about 25 GB in a single-sided single layer and a recording capacity of about 50 GB in single-sided double layers. Further, compared with the BD, BDXL (registered trademark) has been put into practical use, which has a shorter channel bit length, that is, a mark length, a higher density in a linear density direction, and a larger capacity of 100 GB for three layers and 128 GB for four layers.

The BD or a recording medium having a density higher than that of the BD is also used in a data storage device that stores important data for a long period of time by a highly reliable system. The data storage device is required to have a higher density so as to be able to store more data.

In a recording medium such as the optical disc, information is recorded by a recording mark and a space formed in a recording layer of the recording medium. When performing recording on the recording medium, the recording layer of the recording medium is irradiated with recording laser light (appropriately referred to as "recording pulse") having a predetermined pulse shape whose intensity is modulated based on information to be recorded, and a physical state of the recording layer is changed to form a recording mark, so that information is recorded. When playing back the recording medium, a playback signal is obtained by irradiating a recording mark and a space formed in a recording layer with playback laser light having low output power and detecting a change in optical characteristics of the recording mark and the space, for example, a change in reflectance. The recorded information is played back by performing a signal processing on the playback signal.

In an information recording/playback device that performs recording/playback on/from a recording medium, recording compensation is performed to adjust edge positions of a start end and a terminal end of a recording mark so as to reduce errors of a playback signal obtained by playing back a recorded recording mark.

The recording compensation is required particularly at a recording density at which a length of a space between recording marks is short. With the recording density at which the length of the space between the recording marks is short, heat generated when the recording marks are formed does not sufficiently decrease in the space portion, which influences a temperature increase at a start end edge of a succeeding recording mark. Conversely, heat at a start end of the succeeding recording mark influences cooling of heat at a terminal end edge of a preceding recording mark. These influences are referred to as thermal interference, and the thermal interference depends on a length of the space. In order to correct an edge position of a recording mark that varies due to the thermal interference, recording compensation for finely adjusting a pulse shape of a recording pulse in accordance with the length of the space is performed.

When lengths of the recording mark and the space are shortened, an amplitude of a playback signal becomes small, and a difference occurs in the playback signal due to a combination of the recording marks and the space. For example, even when recording mark lengths are the same, a playback signal at an edge portion of the recording mark is detected particularly differently due to a difference between lengths of preceding and succeeding spaces of the recording mark. A cause of a deviation of the playback signal due to the combination of the recording mark and the space is referred to as intersymbol interference. Therefore, it is effective to apply a maximum likelihood decoding method (appropriately referred to as "PRML method") such as partial response maximum likelihood (PRML) as a playback signal processing method. The recording compensation can be performed more accurately by equalizing a waveform of the playback signal by using the PRML method to reduce an influence of the intersymbol interference.

In order to record at a higher recording density, it is necessary to further shorten a length of the recording mark and the space, and to shorten a physical length interval with respect to a difference between recording mark lengths. At this time, there are a plurality of recording marks included in a spot of the laser light, and edge shifts of edge portions of the recording marks interfere and are played back. When physical lengths of the recording mark and the space between the recording marks are respectively shortened due to a high recording density, there is more deviation of other edges subjected to intersymbol interference. Further, since a length of a space with a preceding recording mark is also shortened, an influence of the thermal interference is also increased.

As the recording density increases, influences of the intersymbol interference and the thermal interference become greater, but various recording compensation methods are studied in order to obtain a playback signal with less error from a target expected value signal. For example, JP-A-2011-023069 discloses an example of a method for detecting an edge shift, which is a deviation of an edge position of a recording mark, for performing recording compensation in an optical disc device that performs recording or playback by the PRML method.

In JP-A-2011-023069, attention is paid to an edge of a recording mark in a maximum likelihood bit sequence obtained by decoding a playback signal by the PRML method, and an error bit sequence is generated, which is a most error-prone bit sequence in which bits of the maximum likelihood bit sequence shift at an edge portion or the bits of the maximum likelihood bit string shift as an entire recording mark including the edge portion. Then, the edge shift is evaluated based on a difference in a Euclidean distance between target signals and playback signals corresponding to the maximum likelihood bit sequence and the error bit sequence. Accordingly, in recording compensation at a recording density of about 31 GB in a BD, the edge shift of the edge portion can be directly detected by using a playback signal at an edge portion of a target mark that is a recording mark to be subjected to the recording compensation or a playback signal up to a range of a space length adjacent to a recording mark.

In the recording compensation in the related art, in any recording compensation, an error between the expected value signal and the playback signal is defined only by a cause of an edge shift of a recording mark. In high-density recording and multi-value recording, which fairly exceed an optical resolution in recent years, not only a positional deviation of an edge of a recording mark but also spread and shading in a mark width direction may differ fairly depending on a mark pattern. Therefore, when increasing a density, there is a problem that recording compensation performance sufficient to satisfy desired quality of a playback signal cannot be obtained only by the edge shift.

SUMMARY

The present disclosure has been devised in view of the above-described situations in the related art, and an object thereof is to provide a recording state evaluation method, a recording compensation method, and an information recording/playback device that can obtain recording compensation performance superior to that in the related art and obtain high playback performance.

Aspect of non-limiting embodiments of the present disclosure relates to provide a recording state evaluation method of a recording medium configured to optically perform information recording, the recording state evaluation method including: a step of forming a recording mark on the recording medium by a predetermined recording signal; a step of obtaining a playback signal of the recording mark formed on the recording medium; a step of generating an expected value signal of the playback signal based on the recording signal; and a step of, based on an amplitude error between the playback signal and the expected value signal, and for each predetermined unit of the recording signal, calculating a deviation amount of a mark shape of a recording mark from which the playback signal is acquired with respect to a mark shape of an ideal recording mark from which a playback signal having no amplitude error can be acquired, and estimating a mark shape of the recording mark formed on the recording medium.

Aspect of non-limiting embodiments of the present disclosure relates to provide a recording compensation method of an information recording/playback device configured to optically perform information recording on a recording medium, the recording compensation method including: a step of forming a recording mark on the recording medium by a predetermined recording signal; a step of obtaining a playback signal of the recording mark formed on the recording medium; a step of generating an expected value signal of the playback signal based on the recording signal; a step of, based on an amplitude error between the playback signal and the expected value signal, and for each predetermined unit of the recording signal, calculating a deviation amount of a mark shape of a recording mark from which the playback signal is acquired with respect to a mark shape of an ideal recording mark from which a playback signal having no amplitude error can be acquired, and estimating a mark shape of the recording mark formed on the recording medium; and a step of, based on the deviation amount of the mark shape of the recording mark, calculating a correction amount for each predetermined unit of the recording signal and adjusting a level of the recording signal.

Aspect of non-limiting embodiments of the present disclosure relates to provide an information recording/playback device configured to optically perform information recording on a recording medium, the information recording/playback device including: a recording unit configured to form a recording mark on the recording medium by a predetermined recording signal; a playback unit configured to obtain a playback signal of the recording mark formed on the recording medium; an expected value signal generation unit configured to generate an expected value signal of the playback signal based on the recording signal; and a recording state evaluation unit configured to, based on an amplitude error between the playback signal and the expected value signal, and for each predetermined unit of the recording signal, calculate a deviation amount of a mark shape of a recording mark from which the playback signal is acquired with respect to a mark shape of an ideal recording mark from which a playback signal having no amplitude error can be acquired, and estimate a mark shape of the recording mark formed on the recording medium.

According to the present disclosure, it is possible to obtain recording compensation performance superior to that in the related art and obtain high playback performance.

BRIEF DESCRIPTION OF DRAWINGS

FIG. 8 is a table showing an example of a pattern of a recording mark used in the mark shape estimation algorithm.

DESCRIPTION OF EMBODIMENTS

Hereinafter, each embodiment in which a configuration according to the present disclosure is specifically disclosed will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

In the present embodiment, in order to describe a recording state evaluation method and a recording compensation method according to the present disclosure, an optical disc device will be described as an example of an information recording/playback device.

In the present embodiment, high-density recording that exceeds optical resolution of the optical disc device such as a BD or a BDXL (registered trademark) will be described. Therefore, a recording medium of the embodiment is a recording medium that performs the high-density recording that exceeds the optical resolution. A recording density that exceeds an optical resolution is determined by a wavelength λ of laser light and a numerical aperture NA, and is a case where a length L of a shortest mark and a shortest space is λ/(4×NA) or less. In a case of a BD system, the length L is about 119.1 nm because λ=405 nm and NA=0.85 in general. When a structure of the recording medium is the same as that of the BD, a recording density is equivalent to about 31 GB. Therefore, the recording density that exceeds the optical resolution is about 31 GB or more, but the present disclosure is not limited to the recording density of about 31 GB or more, and is also applicable to a recording density equal to or smaller than the optical resolution.

As a modulation code in the embodiment, a run length limited encoding code (RLL code) such as an RLL (1, 7) code is used. At this time, description will be provided while setting a shortest run length of the modulation code to 2T and a longest run length to 8T. Therefore, the length of 2T, which is the shortest mark and the shortest space, is about 119.1 nm or less.

In the present specification, a direction in which a light beam spot travels on the optical disc by rotation of the optical disc serving as the recording medium while taking a certain position as a starting point is referred to as "succeeding direction" of the certain position, and a direction opposite to the direction while taking the certain position as a starting point is referred to as "preceding direction".

Figure 1:
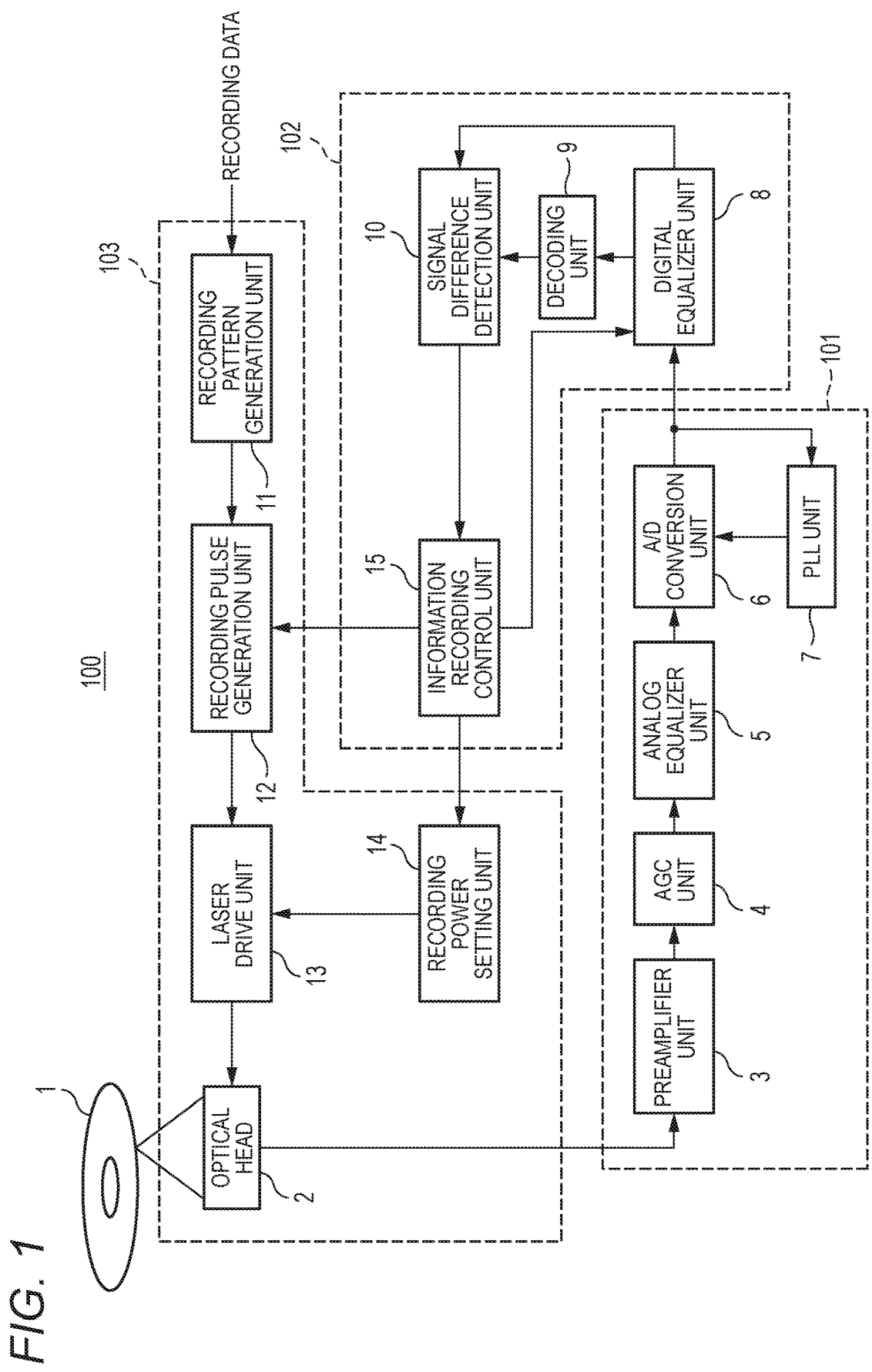
FIG. 1 is a block diagram showing an example of a configuration of an information recording/playback device according to an embodiment.

FIG. 1 is a block diagram showing an example of a configuration of the information recording/playback device according to the embodiment. An information recording/ playback device 100 includes a playback unit 101, a recording compensation unit 102, and a recording unit 103.

The playback unit 101 includes a preamplifier unit 3, an AGC unit 4, an analog equalizer unit 5, an analog/digital (A/D) conversion unit 6, and a PLL unit 7.

The recording compensation unit 102 includes a digital equalizer unit 8, a decoding unit 9, a signal difference detection unit 10, and an information recording control unit 15.

The recording unit 103 includes an optical head 2, a recording pattern generation unit 11, a recording pulse generation unit 12, a laser drive unit 13, and a recording power setting unit 14.

The information recording/playback device 100 records and plays back information on and from a recording medium 1. The recording medium 1 is a recording medium on which information is optically recorded and played back, and is, for example, an optical disc.

The optical head 2 converges laser light that has passed through an objective lens (not shown) on a recording layer of the recording medium 1, receives the reflected light, and generates a playback signal indicating information recorded on the recording medium 1. For example, the numerical aperture NA of the objective lens is 0.84 to 0.86, and more preferably 0.85. A wavelength of the laser light is 400 nm to 410 nm, and more preferably 405 nm.

The preamplifier unit 3 amplifies the playback signal with a predetermined gain and outputs the amplified playback signal to the AGC unit 4. The AGC unit 4 amplifies the reproduction signal such that a level of the playback signal output from the A/D conversion unit 6 becomes a constant level by using a preset target gain, and outputs the amplified playback signal to the analog equalizer unit 5. The analog equalizer unit 5 has a low-pass filter (LPF) characteristic for blocking a high-frequency band of the playback signal and a filter characteristic for amplifying a predetermined frequency band of the playback signal, equalizes a playback waveform to a desired characteristic, and outputs the equalized playback waveform to the A/D conversion unit 6.

The PLL unit 7 generates a playback clock synchronized with the playback signal after the waveform equalization, and outputs the generated playback clock to the A/D conversion unit 6. The A/D conversion unit 6 samples the playback signal in synchronization with the playback clock output from the PLL unit 7, converts an analog signal into a digital signal, and outputs the digital signal to the PLL unit 7 and the digital equalizer unit 8.

The digital equalizer unit 8 adjusts a frequency of the playback signal such that a frequency characteristic of the playback signal during recording and playback becomes a preset frequency characteristic, for example, a modulation transfer function (MTF) characteristic corresponding to a recording density, or a PR equalization characteristic. The decoding unit 9 decodes the waveform-equalized playback signal output from the digital equalizer unit 8 and generates a binarization signal. The decoding unit 9 is, for example, decoding using a Viterbi algorithm, or decoding using a Bahl-Cocke-Jelinek-Raviv (BCJR) algorithm.

The signal difference detection unit 10 receives the waveform-equalized playback signal output from the digital equalizer unit 8 and the binarization signal output from the decoding unit 9. The signal difference detection unit 10 generates an expected value signal based on the binarization signal and a frequency characteristic targeted by the waveform equalization of the digital equalizer unit 8. The signal difference detection unit 10 detects a signal difference between the playback signal and the expected value signal.

The information recording control unit 15 controls units of the information recording/playback device, such as the playback unit 101, the recording compensation unit 102, the recording unit 103, and a servo control unit (not shown), in order to adjust a recording pulse condition. Further, the information recording control unit 15 controls a selection of a recording pattern and a recording/playback operation when adjusting the recording pulse condition.

The information recording control unit 15 controls the recording unit 103 so as to record, on the recording medium 1, recording data including at least one or more recording marks or spaces having a recording density that exceeds an optical resolution determined by the wavelength of the laser light and the numerical aperture NA, which are optical conditions of the optical head 2. For example, when the wavelength of the laser light is 405 nm and the numerical aperture NA is 0.85, the length of the shortest mark or the shortest space is less than 119.1 nm.

The information recording control unit 15 sets an optimal equalization characteristic, for example, the PR equalization characteristic, in accordance with the set length of the recording mark for the digital equalizer unit 8.

The information recording control unit 15 receives the signal difference output from the signal difference detection unit 10. The information recording control unit 15 performs a recording/playback operation of recording data on the recording medium 1 under a plurality of recording conditions. Further, the information recording control unit 15 compares a signal difference measured for each recording condition with a target value stored in the information recording control unit 15, and determines a recording condition closest to the target value. The target value is, for example, 0. The information recording control unit 15 is, for example, a controller of the optical disc device.

The recording pattern generation unit 11 generates a non return to zero inverting (NRZI) signal serving as a recording pattern based on input recording data. The recording pulse generation unit 12 generates a recording pulse sequence in accordance with the NRZI signal based on recording parameters changed by the information recording control unit 15.

The recording power setting unit 14 sets each recording power such as peak power Pp and bottom power Pb. The laser drive unit 13 controls a laser emission operation of the optical head 2 in accordance with the recording pulse sequence generated by the recording pulse generation unit 12 and the recording power set by the recording power setting unit 14.

Figure 2:
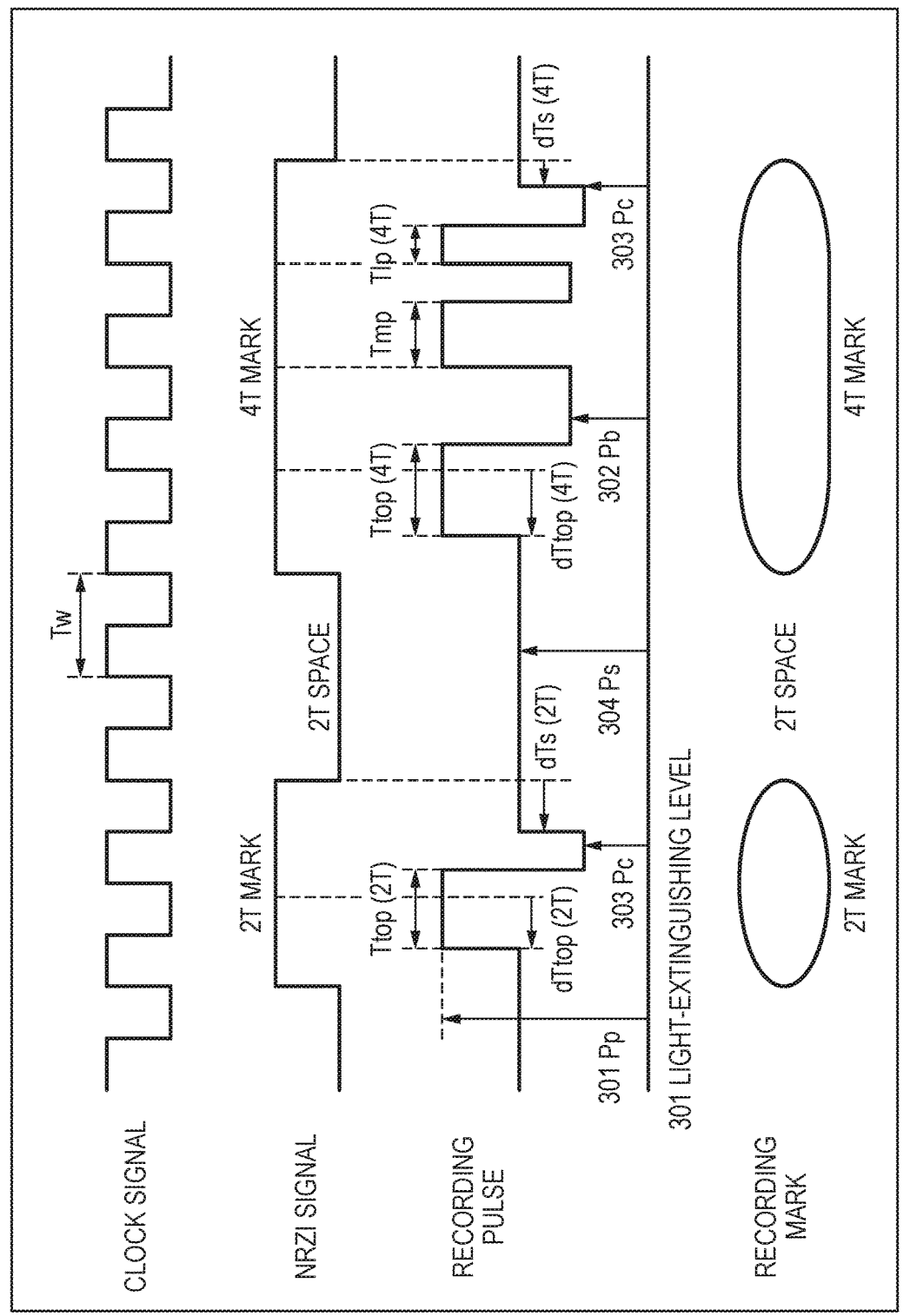
FIG. 2 is a diagram illustrating an example of a recording pulse waveform and recording power when information recording is performed by the information recording/playback device.

FIG. 2 is a diagram illustrating an example of a recording pulse waveform and recording power when information recording is performed by the information recording/playback device.

In FIG. 2, a clock signal, an NRZI signal, a recording pulse of a multi-pulse sequence, and a recording mark are shown from a top side.

The clock signal is a period Tw (also appropriately referred to as channel bit) of a channel clock serving as a reference signal at the time of creating recording data, and the period Tw determines a time interval between a recording mark and a space of the NRZI signal that is a recording signal. The NRZI signal shows a recording pattern of 2T mark-2T space-4T mark as a partial example.

A multi-pulse sequence is a multi-pulse sequence of laser light for forming a recording mark. Recording power Pw of the multi-pulse sequence includes peak power Pp 301 having a heating effect necessary for forming the recording mark, bottom power Pb 302 and cooling power Pc 303 having a cooling effect, and space power Ps 304 that is recording power of a space portion. The peak power Pp 301, the bottom power Pb 302, the cooling power Pc 303, and the space power Ps 304 are set such that a light-extinguishing level 305 detected when the laser light is extinguished is set with respect to a reference level. Levels of the recording powers may be set in accordance with a recording mark length.

With respect to a pulse width, a beginning pulse width Ttop is set for each of recording signals of 2T, 3T, 4T, and 5T or more. A pulse width Tmp after the Ttop that exists in a multi-pulse sequence of 3T or more is set to the same setting, and a final pulse width Tmp is set as a last pulse width Tlp. The last pulse width Tlp is set for each of the recording signals of 3T, 4T, and 5T or more. Further, for each recording mark length, a recording start position offset dTtop for adjusting a start end position of a recording mark and a recording end position offset dTs for adjusting a terminal end position are set.

The present disclosure exemplifies a technique of estimating a mark shape and evaluating a recording state by defining a mark level as a parameter representing a shape of a recording mark formed on the recording medium and calculating a deviation amount of a mark shape with respect to an ideal recording mark by using the mark level. The mark shape is estimated for each predetermined unit of the recording signal, for example, in units of 1 channel bit (1T). The present disclosure exemplifies a technique of performing the recording compensation for adjusting a level of a recording signal in accordance with the estimated mark shape and performing writing under an optimal recording condition in order to reduce optical intersymbol interference or thermal interference generated when recording or playing back a mark sufficiently smaller than a light beam spot diameter.

In the embodiment, a correction amount of the recording signal based on the estimated mark shape is calculated in order to form an ideal recording mark (appropriately referred to as "ideal mark") in which an ideal playback signal (appropriately referred to as "ideal signal") without an amplitude error can be obtained in the recording layer of the recording medium. The correction amount of the recording signal corresponds to the deviation amount of the mark shape with respect to the ideal mark, that is, a mark level difference. For example, a level estimation vector Lv, which will be described later, is calculated as the deviation amount of the mark shape. Then, information of an adjustment amount of recording parameters of a recording pulse corresponding to the correction amount of the recording signal is stored by a setting table of the recording conditions or the like, and the recording compensation for adjusting a level of the recording pulse in a predetermined period is performed. For example, recording power at beginning and/or end of the recording pulse is adjusted to an optimal recording condition in accordance with the correction amount of the recording signal based on an estimation result of a mark shape in a unit of 1T. The recording parameters of the recording pulse may be used to perform the recording compensation as a parameter related to the level and an edge shift. In this case, the recording parameters correspond to the power correction amount at the beginning and the end of the recording pulse and an offset of the edge shift (the Ttop, the dTtop, and the like), and the recording compensation is performed by adjusting the parameters.

In this way, in the recording compensation according to the present embodiment, parameters related to the level of the recording pulse (parameters of power and time such as various recording power, pulse widths, and edge shift amounts) are adjusted in accordance with the deviation amount from the ideal mark obtained by the estimation of the mark shape. Accordingly, a heat amount of the laser light radiated to the recording medium is adjusted, and a recording mark having an appropriate shape from which a playback signal close to the ideal signal can be obtained is formed.

The recording conditions, which are the recording parameters such as values of the recording power of the recording pulse, the power correction amount, and the pulse width, are recorded and stored in the recording medium, and are read and used during recording. The recording conditions may be stored in the information recording/playback device. In this case, the information recording/playback device may acquire unique information such as an ID of the recording medium, and read and use a recording condition for the unique information of the recording medium from the recording conditions stored in a storage unit in the device.

Therefore, by reproducing the recording conditions of the recording pulse described in the recording medium or in the information recording/playback device and irradiating the recording layer of the recording medium with the recording laser light, recording marks as shown in FIG. 2 can be formed.

As a recording pulse shape, there are various recording pulse shapes such as a monopulse waveform, an L-type pulse waveform, and a Castle-type pulse waveform in addition to a waveform of the multi-pulse sequence of FIG. 2. Each recording pulse waveform has a different amount of heat accumulated in the recording layer of the information recording medium. Therefore, in order to form an optimal recording mark, the recording pulse shape in accordance with a film characteristic of the recording layer is selected.

Figure 3:
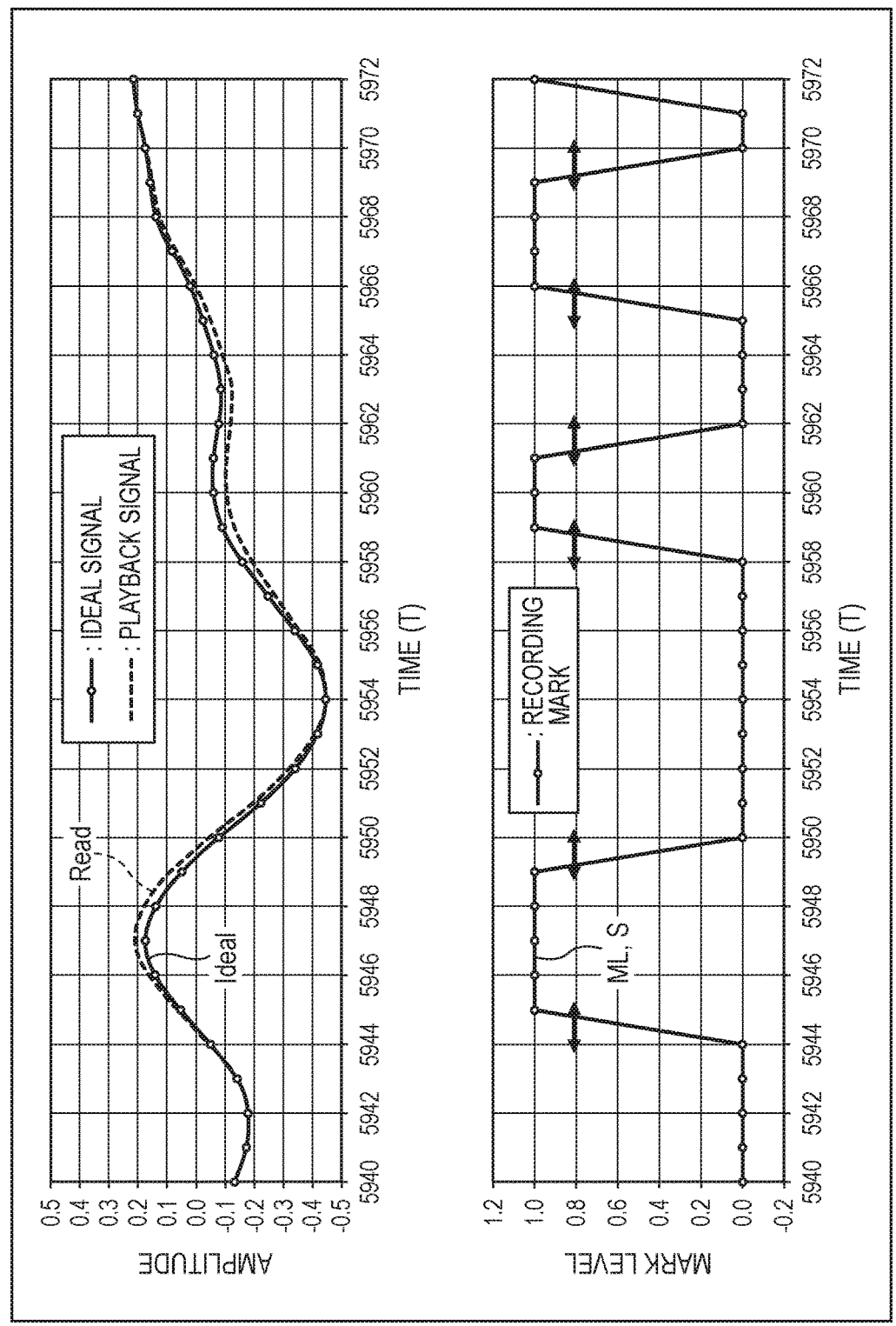
FIG. 3 is a diagram illustrating a playback signal and an ideal signal for a recording mark according to the embodiment, and a mark level of the recording mark.

FIG. 3 is a diagram illustrating a playback signal and an ideal signal for a recording mark according to the embodiment, and a mark level of the recording mark. In FIG. 3, a lower part shows an example of a mark level ML of a recording mark corresponding to a recording signal S, and represents a time characteristic of a mark level of the recording mark with a horizontal axis indicating time and a vertical axis indicating a mark level. An upper part shows an example of an ideal signal Ideal corresponding to the recording signal that forms the recording mark in the lower part and a playback signal Read obtained by playing back the recording mark, and represents time characteristics of both signals with a horizontal axis indicating time and a vertical axis indicating an amplitude.

FIG. 3 exemplifies a case where a 4T mark, an 8T space, a 2T mark, a 3T space, a 3T mark, a 1T space, and the like are recorded on a recording medium as recording marks. The mark level is a parameter representing a mark shape of the recording mark, the physical quantity corresponds to a width, a depth, a concentration, and the like of a mark, and the mark level is a parameter having a correlation with reflectance of the playback laser light. In the present disclosure, the mark level is defined by a one-dimensional parameter, and the mark level is a parameter representing a recording state caused by a plurality of physical quantities such as a width and a depth of a mark related to a shape of a recording mark formed on a recording layer.

The playback signal Read is a signal obtained by playing back a recording mark recorded on a recording medium corresponding to a recording signal by the information recording/playback device.

The ideal signal Ideal is a signal obtained by convolution of an optical transfer function (OTF), which is a transfer function of an optical system of the information recording/playback device, with respect to a recording signal of the recording mark, and corresponds to an ideal playback signal, that is, an expected value signal of the playback signal. The OTF corresponds to a predetermined impulse response of the optical system of the information recording/playback device. Here, when the recording signal is S, the ideal signal Ideal is obtained by the following equation (1).

$$Ideal=OTF*S \qquad (1)$$

Here, * is an operator representing convolution.

In recording compensation of the related art, an edge shift related to the recording signal is performed so that a playback signal in which an error from an expected value signal is as small as possible is obtained. As a recording density increases, sufficient quality of the playback signal may not be obtained only by the edge shift. In an actual recording mark, not only a positional deviation of an edge but also a spread and shading in a mark width direction fairly differ depending on a mark pattern. Therefore, there is a limit in preventing an amplitude error of the playback signal only by the edge shift. Therefore, in the present embodiment, the amplitude error of the playback signal is regarded as a difference from a mark shape of the ideal mark, the mark shape is estimated by calculating a deviation amount (a mark level difference) of the mark shape of the recording mark with respect to the ideal mark, and a recording state is evaluated. The deviation amount of the mark shape calculated at this time is used as a correction amount of the recording signal. The deviation amount of the mark shape corresponds to a difference between a mark level when an error between the expected value signal and the playback signal is zero or equal to or smaller than a predetermined threshold and a mark level of the current recording mark. Then, based on an estimation result of the mark shape, recording compensation for adjusting a level of the recording signal in accordance with the calculated deviation amount of the mark shape is performed. Actually, recording compensation for adjusting a level (recording power) of the recording pulse for each predetermined time unit, an offset of an edge, and the like is performed in accordance with the deviation amount of the mark shape.

Figure 4:
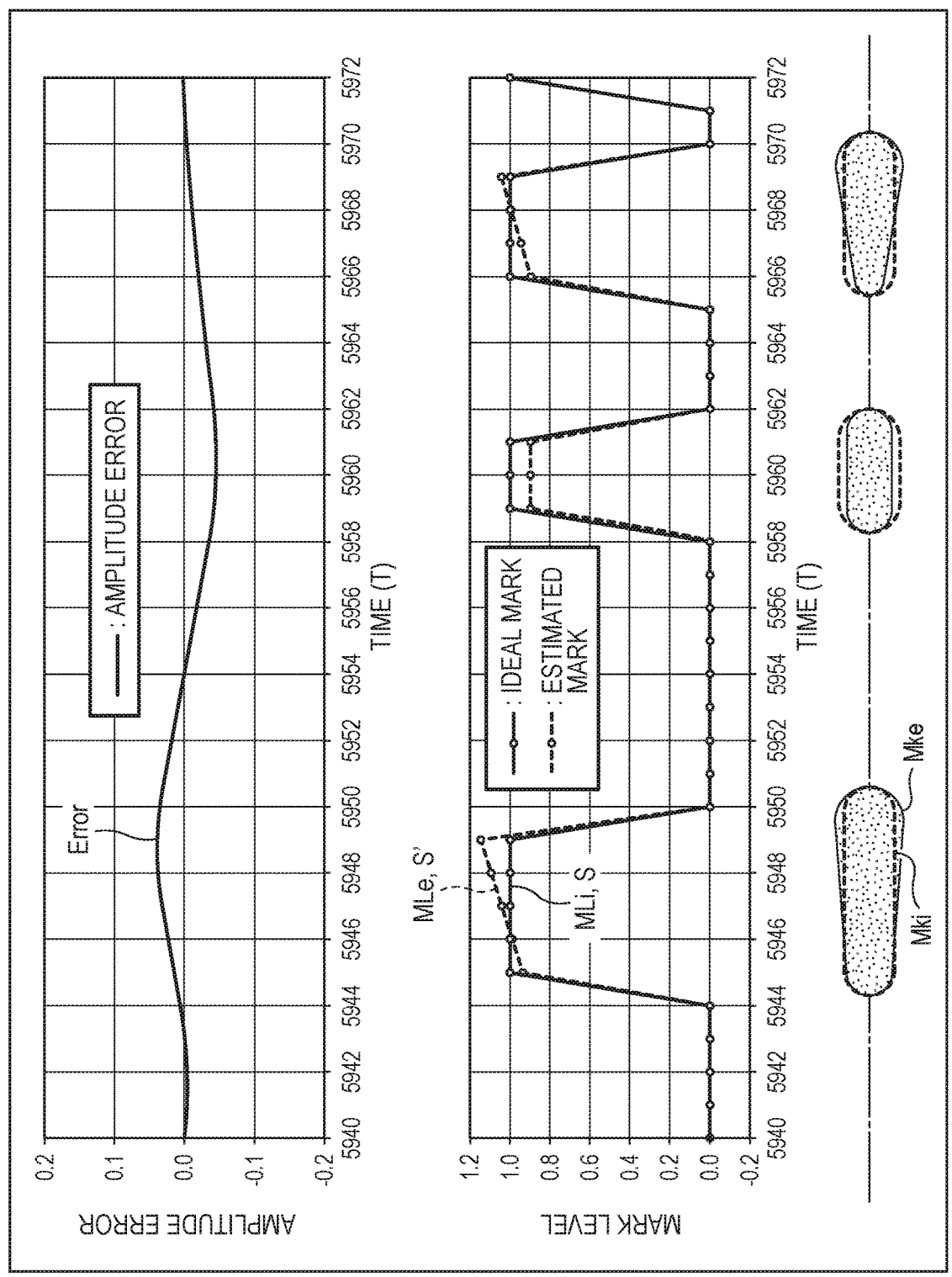
FIG. 4 is a diagram showing an example of an amplitude error of the playback signal, and mark levels of the ideal mark and an estimated mark during mark shape estimation according to the embodiment.

FIG. 4 is a diagram showing an example of an amplitude error of the playback signal, and mark levels of the ideal mark and an estimated mark during mark shape estimation according to the embodiment. In FIG. 4, a middle part shows an example of a mark level MLi of an ideal mark of a recording mark and a mark level MLe of an estimated mark, and represents time characteristics of mark levels of the marks with a horizontal axis indicating time and a vertical axis indicating a mark level. An upper part shows an example of an amplitude error for the ideal signal of the playback signal corresponding to the recording mark in the middle part, and represents a time characteristic of the amplitude error with a horizontal axis indicating time and a vertical axis indicating an amplitude. The amplitude error shown in the upper part of FIG. 4 corresponds to the difference between the playback signal and the ideal signal in the upper part of FIG. 3. A lower part schematically shows mark shapes respectively corresponding to the ideal mark and the estimated mark of the recording mark in the middle part, a broken line represents an ideal mark MKi, and a set of dots represent an estimated mark MKe.

The amplitude error of the playback signal can be calculated by subtracting the ideal signal from the playback signal to obtain a difference as shown in the following equation (2).

$$Error=Read-Ideal \qquad (2)$$

The ideal mark corresponds to the mark level MLi of the ideal recording mark, and is equivalent to a mark level of a recording mark corresponding to the ideal signal, that is, the mark level of the recording mark shown in FIG. 3. The estimated mark is the mark level MLe of a recording mark estimated from the amplitude error of the playback signal, and represents a mark shape of a recording mark on the recording layer estimated for the detected playback signal. For example, the estimated mark can be calculated by acquiring a playback signal when a mark level of a recording mark is shifted from the ideal mark and recorded, and obtaining a mark level when the amplitude error of the playback signal is zero or equal to or smaller than a predetermined threshold, that is, a mark level at which the playback signal coincides with the ideal signal or falls within a predetermined range. A difference between the estimated mark and the ideal mark is a deviation amount of a mark shape.

As shown in the middle part and the lower part of FIG. 4, when the mark level MLe of the estimated mark MKe is larger than the mark level MLi of the ideal mark MKi, it is assumed that a mark shape is formed such that, for example, a mark width is wider than that of the ideal mark. Further, when the mark level MLe of the estimated mark MKe is smaller than the mark level MLi of the ideal mark MKi, it is assumed that the mark shape is formed such that, for example, the mark width is narrower than that of the ideal mark.

Here, a mark shape of the ideal mark can be defined as a mark shape in which a playback signal having no amplitude error with respect to the expected value signal can be obtained. In actual recording and playback, there are factors that cause non-linear behavior such as thermal interference and optical interference of the recording mark, but the recording mark from which the playback signal having no amplitude error is obtained, when including these factors, has the mark shape of the ideal mark.

In the present embodiment, in order to estimate the deviation amount of the mark shape from an ideal state, an example of calculating the deviation amount of the mark shape as the level estimation vector Lv will be described. In order to quantify the deviation amount from the mark shape of the ideal mark, the expected value signal is brought close to the obtained playback signal while shifting the recording signal, so that the estimated deviation amount is obtained. When a recording signal corresponding to the ideal mark is S and a recording signal shifted from the ideal mark is S', for the recording signal S' corresponding to the estimated mark, S' that satisfies the following equation (3) is obtained.

$$\text{Read} - OTF * S' \approx 0 \tag{3}$$

That is, when an expected value signal for the recording signal S' of the estimated mark MKe is Ideal', the expected value signal Ideal' is expressed by the following equation (4).

$$\text{Ideal}' = OTF * S' \tag{4}$$

Here, the level estimation vector Lv is obtained by the following equation (5) based on a difference between the recording signal S' corresponding to the estimated mark and the recording signal S corresponding to the ideal mark. The level estimation vector Lv is a parameter indicating a deviation amount from an ideal mark shape in which the amplitude error of the playback signal is the smallest.

$$Lv = S' - S \tag{5}$$

Then, the recording compensation is performed using the calculated level estimation vector Lv, and recording is performed using a recording signal Sc obtained by subtracting the level estimation vector Lv. In this case, the recording signal Sc after the recording compensation can be obtained by the following equation (6).

$$Sc = S - Lv \tag{6}$$

Such recording compensation is performed, so that a recording mark approximate to the ideal mark can be formed.

Figure 5:
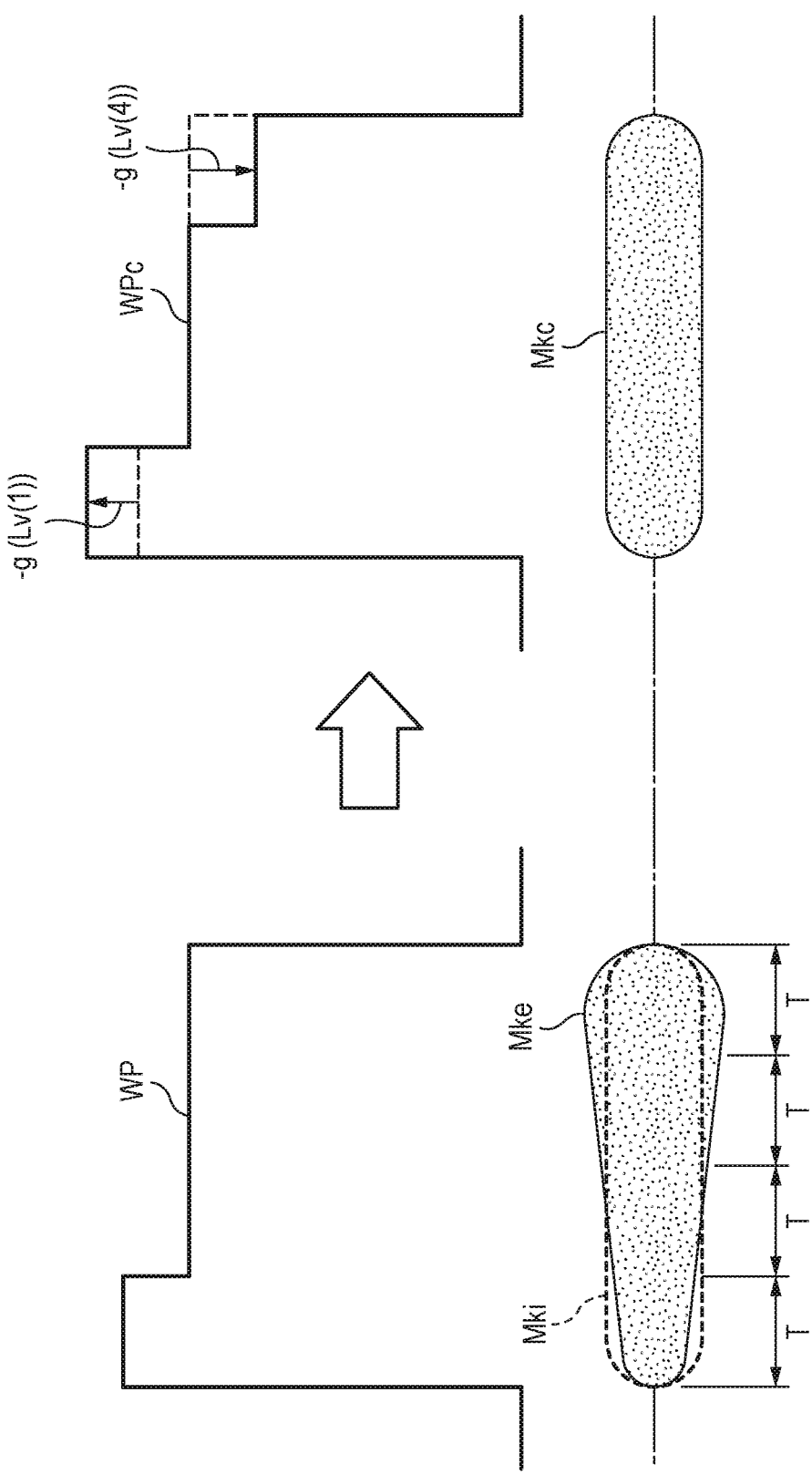
FIG. 5 is a diagram showing an example of recording compensation based on a mark shape estimation result according to the embodiment.

FIG. 5 is a diagram showing an example of recording compensation based on a mark shape estimation result according to the embodiment. FIG. 5 shows an example in which the mark shape estimation and the recording compensation are performed in a unit of 1 channel bit (1T) as a predetermined unit of the recording signal. The mark shape of the recording mark is estimated and calculated by shifting the mark level in the 1T unit, and the deviation amount from the ideal mark is calculated as an estimation result. In an example on a left side of FIG. 5, as a calculation result of the estimated mark, a state is estimated where, in a 4T mark formed by a recording pulse WP, the mark level of the estimated mark MKe is lower than that of the ideal mark MKi at the beginning 1T, and the mark level of the estimated mark MKe is higher than that of the ideal mark MKi at the last 1T. That is, as deviation amounts of the estimated mark shape, a negative deviation amount is calculated for the beginning 1T, and a positive deviation amount is calculated for the last 1T.

In this case, in the recording compensation, as shown on a right side of FIG. 5, as level adjustment of the recording signal, the level adjustment is performed such that, in a recording pulse WPc, the level of the beginning 1T is raised in accordance with the deviation amount and the level of the last 1T is lowered in accordance with the deviation amount. Here, when the deviation amounts of the mark shape are respectively calculated by the level estimation vectors Lv for the beginning 1T and the last 1T of the 4T mark and respectively are Lv (1) and Lv (4), level correction amounts are expressed as −g (Lv (1)) and −g (Lv (4)). g (Lv) is a function representing a correction amount of the recording signal corresponding to magnitude of the level estimation vector Lv. A recording mark MKc approximate to the ideal mark is formed by the recording pulse WPc after the recording compensation level-adjusted in this way. Then, by playing back the recording mark after the recording compensation, a playback signal close to the ideal signal can be obtained.

As described above, by adjusting the mark level at the beginning and/or end of the recording mark, appropriate recording compensation can be performed without considering marks before and after the target mark. Therefore, even when an edge shift is not used, more excellent recording compensation performance can be obtained. For a short recording mark such as a minimum mark of 2T, the mark level may be adjusted in consideration of preceding and succeeding spaces such as a preceding space length.

Figure 6:
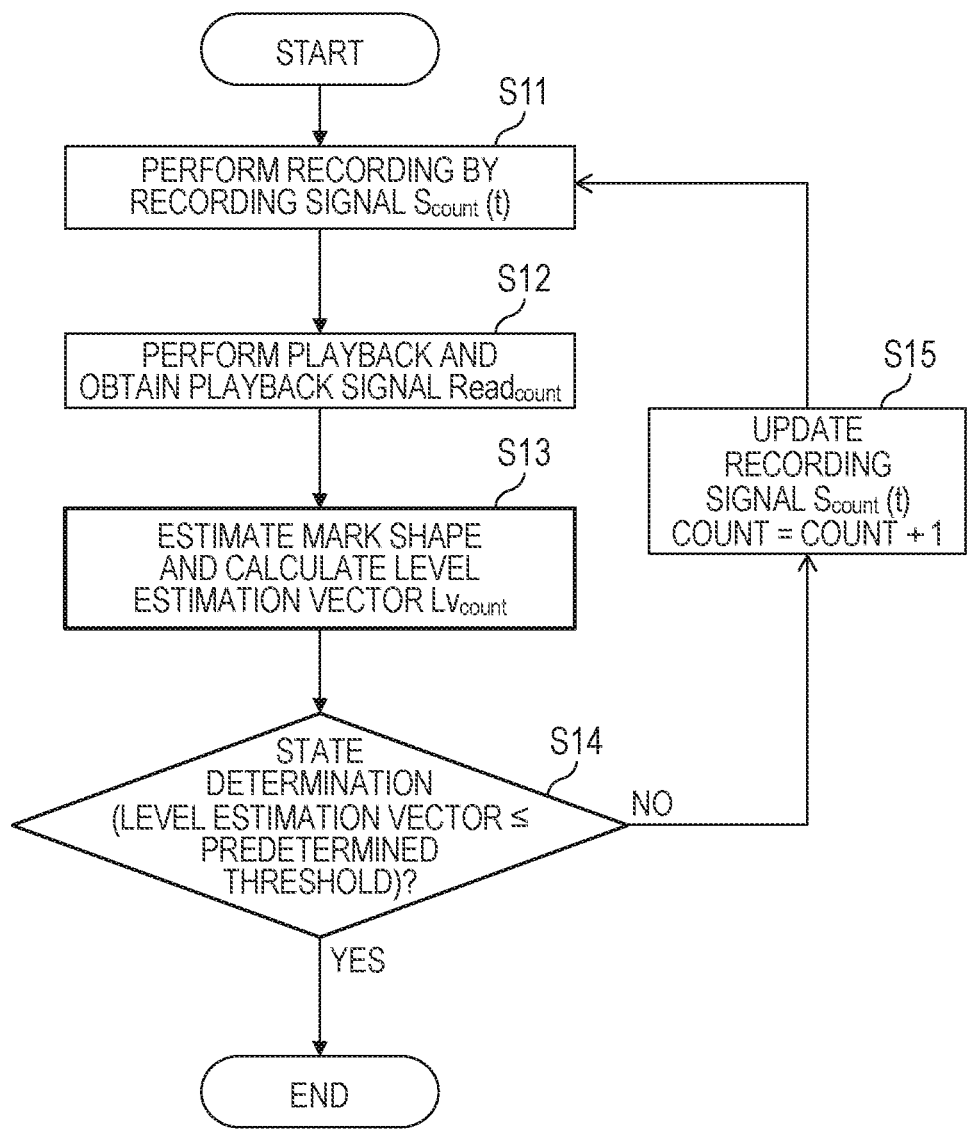
FIG. 6 is a flowchart showing an example of a procedure of a recording compensation processing using the mark shape estimation according to the embodiment.

FIG. 6 is a flowchart showing an example of a procedure of a recording compensation processing using the mark shape estimation according to the embodiment. Here, a case where processings related to the recording compensation are executed by the recording compensation unit 102 of the information recording/playback device 100 will be exemplified. The processings such as a recording state evaluation processing and a recording compensation processing including the mark shape estimation according to the embodiment can also be executed using various computers such as a host computer connected to the information recording/playback device 100 or other information processing devices, and are not limited to the processings in the information recording/playback device 100.

The recording compensation unit 102 controls the recording unit 103 and performs recording on the recording medium 1 by a recording signal $S_{count}(t)$ (S11). Here, the "count" is a count value representing the number of times one processing step is executed, and an initial value is 0. Therefore, the initial value of the recording signal is $S_0(t)$. At this time, under the control of the recording compensation unit 102, the recording unit 103 generates the recording signal $S_{count}(t)$ as a first recording signal having the length L, which is a signal sequence of two or more types of predetermined level values. Then, the recording unit 103 forms a plurality of different types of first recording marks corresponding to the first recording signal on the recording medium 1. Then, the recording compensation unit 102 controls the playback unit 101, plays back a recording mark recorded by the recording signal $S_{count}(t)$, and obtains a playback signal $Read_{count}$ (an initial value is $Read_0$) (S12). At this time, under the control of the recording compensation unit 102, the playback unit 101 obtains the playback signal $Read_{count}$ for a recording mark corresponding to the recording signal $S_{count}(t)$ as a playback signal of the first recording marks formed on the recording medium 1. Subsequently, the recording compensation unit 102 executes a mark shape estimation processing as a mark level estimation step, and calculates a level estimation vector $Lv_{count}$ (an initial value is $Lv_0$) (S13). At this time, the recording compensation unit 102 sets, as a second recording mark, a recording state where a playback signal obtained by playing back the recording mark recorded on the recording medium 1 is equal to a first expected value (see the above equation (1)) obtained by a convolution calculation of the first recording signal and a predetermined impulse response (OTF in this example). Then, the recording compensation unit 102 calculates a first level estimation vector in which a deviation amount of a mark shape between the first recording marks recorded by the first recording signal and the second recording mark is represented by N types of arrangement patterns having a length M (the M is smaller than the length L of the first recording signal), which is a signal sequence of two or more types of predetermined level values. A mark shape estimation algorithm in step S13 will be described later. The level estimation vector Lv is a parameter that is calculated by the estimation processing of the mark shape using the recording signal S (t), the playback signal Read, and the ideal signal Ideal, and that indicates the deviation amount of the mark shape from the ideal mark shape.

Next, the recording compensation unit 102 determines a state of the estimated recording mark (determines a recording state), and determines whether the mark shape of the recording mark is good or bad (S14). As the state determination of the recording mark, for example, the quality determination of the recording state is performed based on whether the calculated level estimation vector $Lv_{count}$ is equal to or smaller than a predetermined threshold Lvth. Accordingly, it is possible to determine whether the recording state of the recording mark recorded on the recording medium, that is, whether the mark shape of the estimated mark is approximate to that of the ideal mark within a predetermined value. It is also possible to perform the state determination of the recording mark by other methods such as quality determination of the mark shape according to other determination conditions using the level estimation vector Lv.

When the calculated level estimation vector $Lv_{count}$ exceeds the predetermined threshold Lvth in the state determination of the recording mark in step S14, the recording compensation unit 102 increments the count value count by 1 (count=count+1) and updates the recording signal $S_{count}(t)$ (S15). In step S15, the recording compensation is performed by updating the recording signal $S_{count}(t)$ by using the level estimation vector Lv. When the level correction of the recording signal using the level estimation vector Lv is performed, the corrected recording signal S (t) is expressed by the following equation (7).

$$S(t)=f(S(t),Lv) \quad (7)$$

In this case, the recording signal $S1(t)$ after the first update is expressed by the following equation (8).

$$S_1(t)=f(S_0(t),-Lv_0) \quad (8)$$

By generalizing this, the updated recording signal $S_{count+1}(t)$ is expressed by the following equation (9).

$$S_{count+1}(t)=f(S_0(t),-Lv_0-Lv_1-Lv_2-\ldots-Lv_{count}) \quad (9)$$

After updating the recording signal by the level estimation vector Lv, the recording compensation unit 102 repeats the processings of steps S11 to S14 described above. When the calculated level estimation vector $Lv_{count}$ is equal to or smaller than the predetermined threshold Lvth in the state determination of the recording mark in step S14, the recording compensation unit 102 ends the recording compensation processing. The recording signal $S_{count}(t)$ when the recording compensation processing is ended corresponds to the recording signal after the recording compensation is performed, and is a recording signal for recording a recording mark close to the ideal mark.

Next, an example of the mark shape estimation algorithm according to the present embodiment will be described. In the present embodiment, as the algorithm for the mark shape estimation, a processing of calculating the amplitude error of the playback signal by shifting the level estimation vector Lv representing the deviation amount of the mark shape of the recording mark from the initial value 0 by a predetermined amount, and updating the level estimation vector Lv by repeating the above processing until the amplitude error is within a predetermined threshold is adopted.

Figure 7:
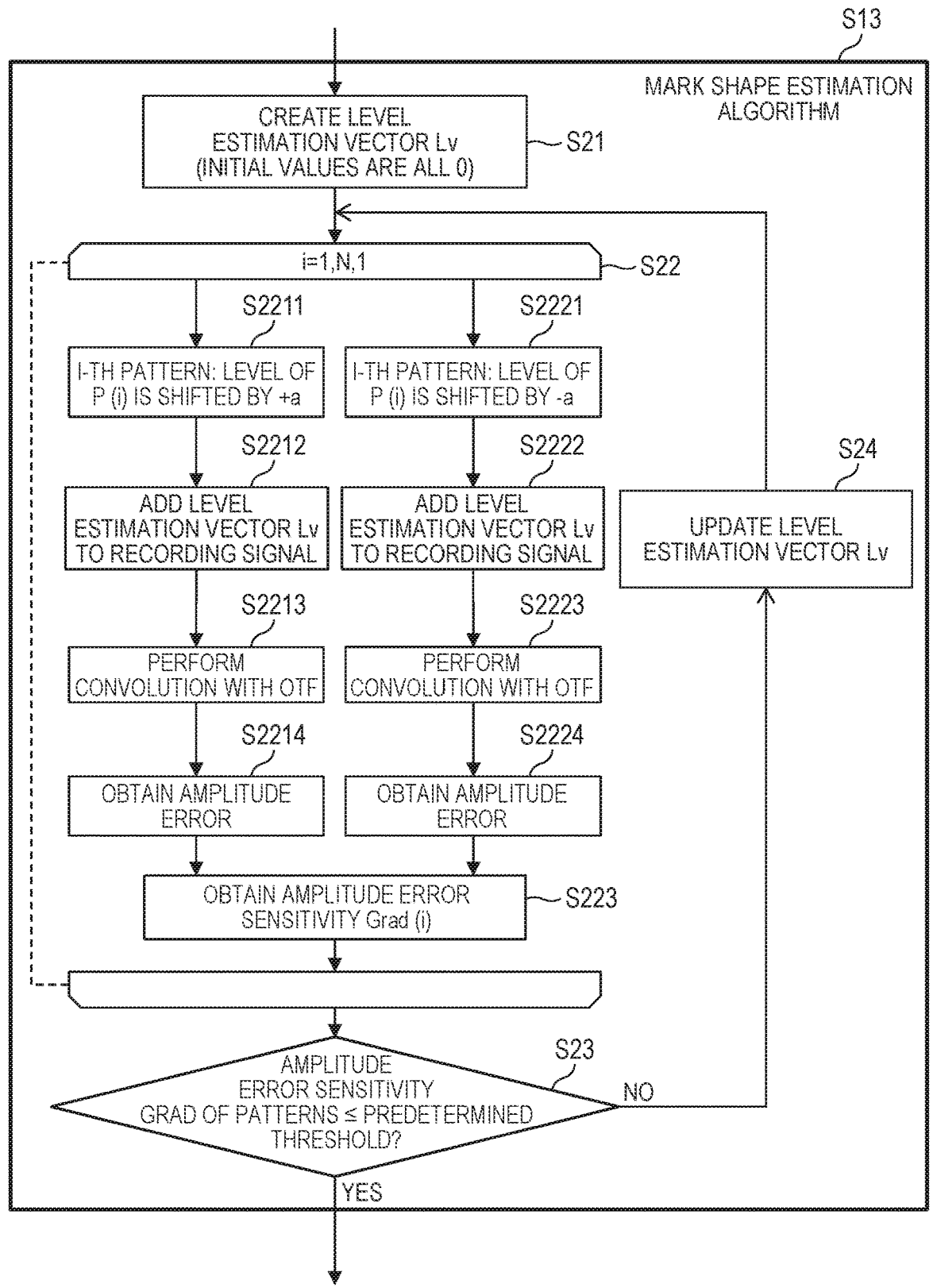
FIG. 7 is a flowchart showing an example of a procedure of a mark shape estimation algorithm according to the embodiment.

FIG. 7 is a flowchart showing an example of a procedure of a mark shape estimation algorithm according to the embodiment. FIG. 8 is a table showing an example of a pattern of a recording mark used in the mark shape estimation algorithm.

In the mark shape estimation algorithm shown in FIG. 7, the recording compensation unit 102 first creates the level estimation vector Lv (S21). The level estimation vector Lv corresponds to the first level estimation vector, and is a vector having the number of elements corresponding to the number of patterns of the recording mark for which the mark shape estimation is performed. Initial values thereof are all 0. That is, in an initial state, the level estimation vector Lv is a vector in which elements of all patterns are 0.

Here, an example of the pattern of the recording mark for which the mark shape estimation is performed will be described. The pattern of the recording mark is a pattern of an encoded bit sequence assumed in information recording, and includes a plurality of patterns represented by a combination of a mark length of target mark and space lengths of a preceding space and a succeeding space, as shown in an example in FIG. 8. Further, in order to calculate the level estimation vector Lv in a unit of 1 channel bit (1T), as the pattern of the recording mark, a pattern that defines a position where a mark level of the target mark is shifted, such as before 2T and after 2T, is used for each 1T. Although not shown, also in a case where the target mark is 3T or more, a pattern indicating a position where the mark level is shifted may be set for each 1T, for example, before 3T, in 3T, after 3T, before 4T, in and before 4T, in and after 4T, after 4T.

FIG. 8 shows a case where the target mark is 2T, and is an example in which patterns before 2T and after 2T are defined for each combination of the preceding spaces of 2T, 3T, 4T, and 5T or more and the succeeding spaces of 2 Ts, and a total of 8 patterns P (1) to P (8) are set.

Hereinafter, 3T or more is also defined in the same manner, and patterns P (1) to P (N) are set. That is, the level estimation vector Lv of the N number of elements is calculated for the N number of patterns, and the mark shape is estimated.

Next, the recording compensation unit 102 performs a processing of calculating amplitude error sensitivity of patterns by shifting a mark level of a target mark up and down for the pattern P (i) (i=1, N, 1 (1 to N, 1 step at a time)) (S22). At this time, for the i-th pattern, the recording compensation unit 102 shifts a level estimation vector Lv (i) by +a as a predetermined amount Δ so as to shift a mark level of a channel bit of the corresponding target mark upward (S2211). Similarly, the recording compensation unit 102 shifts the level estimation vector Lv (i) by −a as the predetermined amount Δ so as to shift the mark level of the channel bit of the corresponding target mark downward (S2221). The predetermined amount Δ by which the level is shifted is, for example, 0.3 or less (a≤0.3). That is, as shown in the following equation (10), level estimation vectors $Lv^+(i)$ and $Lv^-(i)$, which are respectively level-shifted in a positive direction and a negative direction, are calculated. Here, the level estimation vector $Lv^+(i)$ level-shifted in the positive direction corresponds to a second level estimation vector, and the level estimation vector $Lv^-(i)$ level-shifted in the negative direction corresponds to a third level estimation vector.

$$Lv^+(i)=Lv(i)+a$$

$$Lv^-(i)=Lv(i)-a \quad (10)$$

Then, the recording compensation unit 102 uses the level estimation vector $Lv^+$ shifted by +a to generate the level-shifted recording signal $S'^+$ by adding the second level estimation vector to the first recording signal as a second recording signal having the predetermined length L (S2212). Similarly, the recording compensation unit 102 uses the level estimation vector $Lv^-$ shifted by −a to generate a level-shifted recording signal $S'^-$ by adding the third level estimation vector to the first recording signal as a third recording signal having the predetermined length L (S2222). Now, since the i-th level is shifted, when the respective level estimation vectors of +/− are $Lv_i^+$ and $Lv_i^-$ and the recording signals generated using the respective level estimation vectors of +/− are $S_i'^+$ and $S_i'^-$, a calculation equation thereof can be written as the following equation (11).

$$S_i'^+=f(S,Lv_i^+(j)),j=1:N$$

$$S_i'^-=f(S,Lv_i''(j)),j=1:N \quad (11)$$

Here, a function of the function f (S, Lv (j)) using j will be described. Although j is also a pattern number like i, when the recording signal $S_i'$ is generated from the level estimation vector obtained by shifting the i-th level, a processing of adding a level estimation vector $v_j$ of each pattern (j=1:N) to the original recording signal S is performed. Therefore, the level-shifted pattern is the i-th pattern, and the processing of adding the level estimation vector of each pattern to the original recording signal S is performed with j=1:N. As more specific description, a case is considered where a bit sequence, for example, the following equation (12) is given as the recording signal S and the level-shifted pattern is i=2.

$$S=\{1,0,0,1,1,0,0,1,1,1,0,0,\ldots\} \quad (12)$$

j=1 is the first pattern P(1) shown in FIG. 8, which is a pattern of 2T space-2T mark (the target mark is on a preceding side)-2T space, and Lv (1)=$v_1$. Therefore, f (S, Lv (1))={1, 0, 0, 1+$v_1$, 1, 0, 0, 1, 1, 1, 0, . . . }. j=2 is a pattern of 2T space-2T mark (the target mark is on a succeeding side)-2T space, and is a level-shifted pattern. Therefore, Lv (2)=$v_2$+a (or $v_2$−a), and f (S, Lv (2))={1, 0, 0, 1+$v_1$, 1+$v_2$+a, 0, 0, 1, 1, 1, 0, 0 . . . }. Recording signals $S_2'^+$ and $S_2'^-$ shown in the following equation (13) are obtained by performing the processing until j=N.

$$S_{2'^+}=f(S,Lv(N))=\{1,0,0,1+v_1,1+v_2+a,0,0,1+v_9,1+v_{10},1+v_{11},0,0,\ldots\}$$

$$S_{2'^-}=f(S,Lv(N))=\{1,0,0,1+v_1,1+v_2-a,0,0,1+v_9,1+v_{10},1+v_{11},0,0,\ldots\} \quad (13)$$

The above processing is a processing for obtaining a recording signal $S_2'^+$ ($S_2'^-$) from the recording signal S and a level estimation vector $Lv_2^+$ ($Lv_2^-$).

Figure 9:
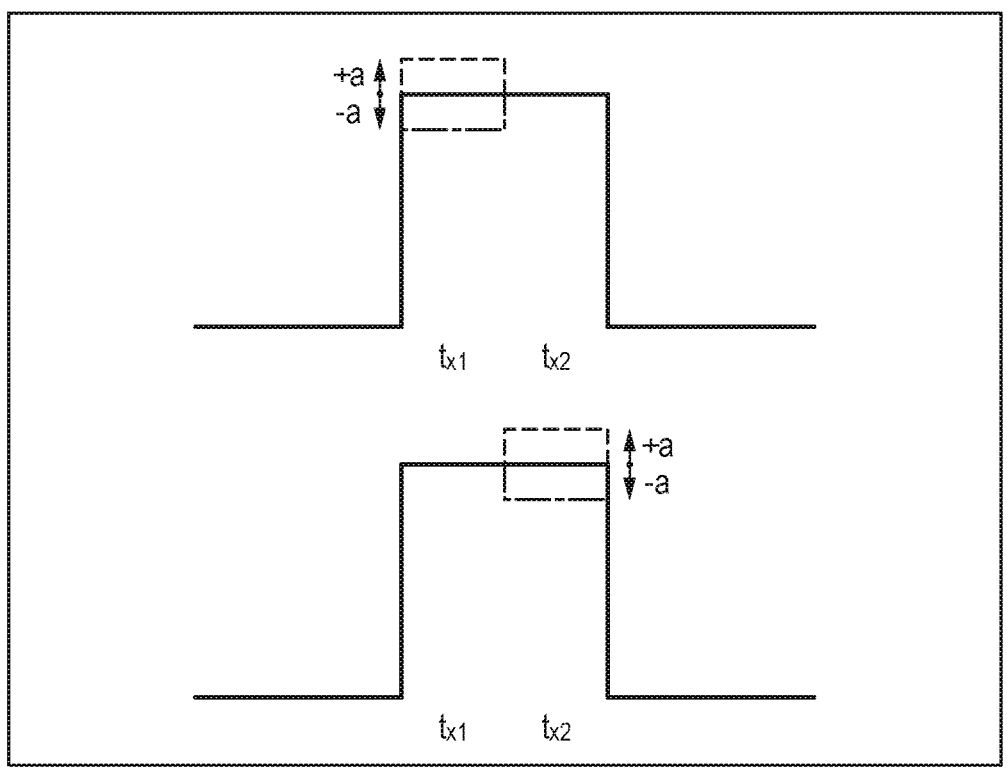
FIG. 9 is a diagram showing an example of a recording signal obtained by level-shifting a channel bit of interest in the mark shape estimation algorithm.

FIG. 9 is a diagram showing an example of a recording signal obtained by level-shifting a channel bit of interest in the mark shape estimation algorithm. In the 2T mark, in a case where a bit before 2T is level-shifted, when a position before 2T is t=$t_{x1}$, ($t_{x1}$)=1+a and $S'^-$ ($t_{x1}$)=1−a. Similarly, in a case where a bit after 2T is level-shifted, when a position after 2T is t=$t_{x2}$, $S'^+(t_{x2})$=1+a and $S'^-$ ($t_{x2}$)=1−a.

Next, the recording compensation unit 102 convolutes the optical transfer function OTF serving as a predetermined impulse response with a recording signal S' (t) that is the second recording signal level-shifted in the positive direction, and obtains an expected value signal serving as a second expected value signal (S2213). Similarly, the recording compensation unit 102 convolutes the optical transfer function OTF with a recording signal $S'^-$ (t) that is the third recording signal level-shifted in the negative direction, and obtains an expected value signal serving as a third expected value signal (S2223). That is, as shown in the following equation (14), ideal signals (expected value signals) $Ideal'^+$ and $Ideal'^-$ when levels are respectively shifted in the positive direction and the negative direction are calculated.

$$Ideal'^+=OTF*S'^+$$

$$Ideal'^-=OTF*S'^- \quad (14)$$

Here, * is an operator representing convolution.

Subsequently, the recording compensation unit 102 squares an error between the second expected value signal and a playback signal corresponding to the second expected value signal and integrates the squared error by the length L, so that an amplitude error when a level is shifted in the positive direction is calculated as a second square error. At this time, the recording compensation unit 102 calculates an amplitude error $\sqrt{(\sigma+^2)}$ when a level is shifted in the positive direction by using the playback signal Read of the recording mark recorded by the recording signal S (t) and acquired in steps S11 and S12 of FIG. 6 (S2214). Further, the recording compensation unit 102 squares an error between the third expected value signal and a playback signal corresponding to the third expected value signal and integrates the squared error by the length L, so that an amplitude error when a level is shifted in the negative direction is calculated as a third square error. At this time, the recording compensation unit 102 calculates an amplitude error $\sqrt{(\sigma-^2)}$ when a level is shifted in the negative direction in the same manner as described above (S2224). Here, $\sqrt{(x)}$ represents a square root of x. That is, as shown in the following equation (15), the amplitude errors $\sqrt{(\sigma+^2)}$ and $\sqrt{(\sigma-^2)}$ are calculated from the expected value signals $Ideal'^+$ and $Ideal'^-$ when the levels are respectively shifted in the positive direction and the negative direction and the playback signal Read.

[Formula 1]

$$\sqrt{\sigma_+^2} = \sqrt{\sum_{i=1}^{N}(\text{Read}-\text{Ideal}'^+)^2/n} \quad (15)$$

$$\sqrt{\sigma_-^2} = \sqrt{\sum_{i=1}^{N}(\text{Read}-\text{Ideal}'^-)^2/n}$$

Here, n is the number of evaluation bits. For example, an amplitude error is calculated for recording data of the number of bits to be evaluated by using a value such as n=400000T, and an encoded bit sequence of a predetermined number of evaluation bits is evaluated.

Then, the recording compensation unit 102 calculates error sensitivity of an i-th arrangement pattern by obtaining a difference between the second square error and the third square error. At this time, the recording compensation unit 102 uses the amplitude errors $\sqrt{(\sigma_+^2)}$ and $\sqrt{(\sigma_-^2)}$ when the levels are respectively shifted in the positive direction and the negative direction to obtain amplitude error sensitivity Grad indicating a slope of an amplitude error change serving as the error sensitivity (S223). That is, Grad (i) is calculated as shown in the following equation (16).

$$\text{Grad}(i)=\sqrt{(\sigma_+^2)}-\sqrt{(\sigma_-^2)} \quad (16)$$

The recording compensation unit 102 calculates error sensitivity of all patterns of arrangement patterns of i=1 to N. At this time, the recording compensation unit 102 repeatedly executes the processing of the above step S22 by executing a processing loop N times from 1 to N, and obtains the amplitude error sensitivity Grad (i) for all patterns of the N patterns P(i).

In the above processing example, a standard deviation $\sqrt{(\sigma^2)}$ is obtained as an amplitude error instead of a variance σ of an error. Since the level estimation vector Lv is a dimension of an amplitude, by obtaining the amplitude error sensitivity Grad by the amplitude error $\sqrt{(\sigma^2)}$ of a standard deviation, the amplitude error sensitivity Grad is also the dimension of the amplitude, and dimensions of parameters are matched. The amplitude error sensitivity Grad may be calculated using an amplitude error σ of a variance.

Next, the recording compensation unit 102 determines whether there is a pattern that exceeds a predetermined threshold in the error sensitivity of all patterns. At this time, the recording compensation unit 102 determines magnitude of an amplitude error by using the amplitude error sensitivity Grad (i) of the N patterns P (i). For example, it is determined whether the amplitude error has converged near zero based on whether the amplitude error sensitivity Grad (i) of the patterns is equal to or smaller than a predetermined threshold Gradth (S23).

When the amplitude error sensitivity Grad (i) of the patterns exceeds the predetermined threshold Gradth in the determination of the amplitude error sensitivity in step S23, the recording compensation unit 102 updates the level estimation vector Lv (S24). At this time, as shown in the following equation (17), the updated level estimation vector Lv is obtained by multiplying the amplitude error sensitivity Grad by a predetermined update coefficient k and adding a multiplication result to the level estimation vector Lv. For example, the recording compensation unit 102 multiplies the amplitude error sensitivity of all patterns by the predetermined coefficient k such that an absolute value after multiplication is 0.5 or less to add a multiplication result to the first level estimation vector, and updates the first level estimation vector.

$$Lv=Lv+\text{Grad}\times k \quad (17)$$

Then, the recording compensation unit 102 returns to the step of performing the level shift, and repeats the processings of steps S22 to S23 until the amplitude error sensitivity Grad (i) is equal to or smaller than the predetermined threshold Gradth.

Figure 10:
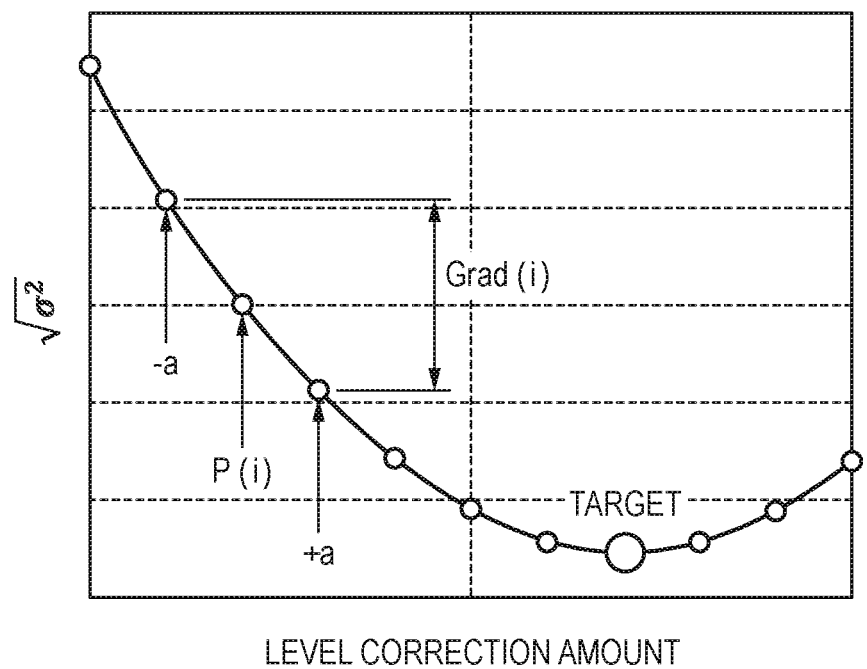
FIG. 10 is a diagram illustrating amplitude error sensitivity and an update of a level estimation vector in the mark shape estimation algorithm.

FIG. 10 is a diagram illustrating amplitude error sensitivity and an update of a level estimation vector in the mark shape estimation algorithm. As shown in an example in FIG. 10, the amplitude error $\sqrt{(\sigma_+^2)}$ when the level of the level estimation vector Lv is shifted by +a and the amplitude error $\sqrt{(\sigma_-^2)}$ when the level of the level estimation vector Lv is shifted by −a are calculated with respect to the amplitude error $\sqrt{(\sigma^2)}$ when the pattern P (i) is used. Then, the amplitude error sensitivity Grad (i) is calculated by obtaining a difference between the amplitude error $\sqrt{(\sigma_+^2)}$ and the amplitude error $\sqrt{(\sigma_-^2)}$. A target value of the level estimation vector Lv corresponding to the correction amount (the level correction amount) of the mark level of the recording mark is a value of a minimum point at which the amplitude error $\sqrt{(\sigma^2)}$ is minimized. In this case, the amplitude error sensitivity Grad (i) represents a slope of a difference of an amplitude error when the amplitude error is level-shifted by a predetermined amount in the positive and negative directions, and an update direction (a direction of level correction) of the level estimation vector Lv is known depending on whether a sign is positive or negative. When the amplitude error sensitivity Grad (i) is positive, the level estimation vector Lv is updated in a direction of decreasing. On the other hand, when the amplitude error sensitivity Grad (i) is negative, the level estimation vector Lv is updated in a direction of increasing. The example of FIG. 10 shows a case where the amplitude error sensitivity Grad (i) is negative.

When updating the level estimation vector Lv, an amount of one update is adjusted by multiplying the amplitude error sensitivity Grad by the predetermined update coefficient k and adding a multiplication result to the level estimation vector Lv. Accordingly, it is possible to prevent the amplitude error from being largely deviated from a target value, and to gradually bring the amplitude error close to the target value and converge the amplitude error. In the present embodiment, the amplitude error sensitivity is obtained and determined for all N patterns, the level estimation vector Lv is updated at a time, and the processing is executed until the amplitude error falls within a predetermined value.

In the determination of the amplitude error sensitivity in step S23, when the amplitude error sensitivity Grad (i) of all N patterns is equal to or smaller than the predetermined threshold Gradth, the mark shape estimation processing ends. By the mark shape estimation processing described above, the deviation amount of the mark shape from the ideal mark shape is quantified, and the level estimation vector Lv representing the estimation result of the mark shape is obtained. In the mark level estimation step described above, the recording compensation unit 102 sets the initial value of the first level estimation vector to all elements 0, and repeatedly performs the processing until the error sensitivity of all patterns is equal to or smaller than a predetermined threshold, so that the deviation amount of the mark shape between the first recording mark recorded on the recording medium and the second recording mark is estimated.

The recording compensation unit 102 uses the level estimation vector Lv calculated by the mark shape estimation algorithm to determine the deviation amount from the ideal mark shape with respect to a mark shape of a recording mark under a current recording condition, and to perform the recording compensation such that the deviation amount is equal to or smaller than a predetermined threshold. Specifically, the recording compensation unit 102 repeats the processing of adding the level estimation vector Lv to the current recording signal S to update the level estimation vector Lv and of calculating the level estimation vector Lv until the level estimation vector Lv indicating the deviation amount of the mark shape is equal to or smaller than the predetermined threshold Lvth by the recording compensation processing of FIG. 6 described above. In this way, the mark shape of the recording mark is made closer to the ideal mark shape by recording the recording signal obtained by subtracting the estimated deviation amount of the mark shape from the current recording signal. With such recording compensation, the mark shape can be made closer to the ideal shape, and a playback signal close to the expected value signal can be obtained.

Here, an example of an operation of the information recording/playback device 100 will be described. The information recording/playback device 100 reads the recording conditions stored in the recording medium or the storage unit in the device as recording parameters. Then, the information recording/playback device 100 sets recording data for performing the recording state evaluation and the recording compensation. Subsequently, the information recording/playback device 100 executes the recording/playback operation of the recording data on the recording medium 1.

In the recording operation, the information recording control unit 15 causes the optical head 2 to move to a recording region for adjusting the recording parameters. The laser drive unit 13 of the recording unit 103 controls the laser emission operation of the optical head 2 in accordance with the recording pulse sequence generated by the recording pulse generation unit 12 and the recording power set by the recording power setting unit 14. The optical head 2 irradiates a track of the recording region of the recording medium 1 with the laser light of the recording power. Accordingly, a recording mark in accordance with the recording data is formed and recorded on the recording layer of the recording medium 1. In the playback operation, the optical head 2 irradiates the track of the recording mark of the recording medium 1 recorded by the recording operation with the laser light of the playback power, receives the reflected light, and generates a playback signal. The playback unit 101 amplifies the playback signal, performs AD conversion and the like, and outputs a playback signal of the digital signal. The digital equalizer unit 8 of the recording compensation unit 102 equalizes a waveform of the playback signal. The decoding unit 9 decodes the waveform-equalized playback signal output from the digital equalizer unit 8 and generates a binarization signal. The signal difference detection unit 10 calculates an amplitude error between the expected value signal and the playback signal.

The information recording control unit 15 executes functions as a recording state evaluation unit and the recording compensation unit, and executes a processing related to the mark shape estimation of the recording mark and the recording compensation that use the above-described level estimation vector based on the recording signal of the set recording data, the acquired playback signal, and the amplitude error of the playback signal. At this time, the information recording control unit 15 estimates a mark shape by calculating the level estimation vector and determines whether the mark shape is possible to evaluate a recording state. Further, the information recording control unit 15 performs the recording compensation by adjusting a level of the recording signal by using the calculated level estimation vector. Then, the information recording control unit 15 repeats an operation of calculating the level estimation vector by recording and playing back the recording signal while level-adjusting the recording signal such that the level estimation vector is equal to or smaller than a predetermined value. By such an operation, the level of the recording signal is appropriately adjusted such that a recording mark close to the ideal mark shape can be formed.

In the embodiment described above, an example in which the recording mark having the binary information is recorded on the recording medium by using the recording signal obtained by encoding the recording data of the binary information has been shown, but the number of bits of information to be recorded is not limited thereto. For example, the present embodiment is similarly applicable to a case of recording a recording mark having multi-value information such as 4-value, 8-value, and 16-value information. Particularly, in recording of the multi-value information, a case where sufficient recording compensation is difficult only by the edge shift is assumed, but it is possible to satisfy recording compensation performance required by a device or a system by the recording compensation using the mark shape estimation and the mark shape estimation result of the present embodiment.

The recording state evaluation (the mark shape estimation) and the recording compensation using the mark shape estimation according to the present embodiment can be used in adjustment of a recording state, adjustment of a recording state during initialization of the device, and the like in a manufacturing step of the information recording/playback device. The recording state evaluation and the recording compensation of the present embodiment are used, so that it is possible to align shapes of recording marks even on recording media of different individuals and in information recording/playback devices of different individuals, and it is possible to combine recording states of recording marks recorded on recording media.

As described above, in the present embodiment, by using the level estimation vector, the deviation amount of the mark shape from the ideal recording mark is calculated, and the mark shape of the recording mark is estimated, so that it is possible to detect the deviation amount of the mark shape and evaluate a recording state. At this time, a delicate shape of the recording mark can be accurately estimated by calculating the level estimation vector. Further, by adjusting the level of the recording signal by using an estimation result of the mark shape of the recording mark, it is possible to implement recording compensation having higher accuracy than recording compensation using the edge shift, or the like. Therefore, in the high-density recording or the multi-value recording, it is possible to obtain recording compensation performance superior to that in the related art, and to obtain high playback performance.

The processing procedure in the present embodiment may have any procedure as long as the above steps can be executed. Further, the present disclosure may be a recording/playback program for executing a function of the information recording/playback device in the embodiment. The recording/playback program may be stored in a memory in the information recording/playback device according to the present embodiment. Alternatively, after the information recording/playback device is shipped, the recording/playback program may be stored in the memory in the information recording/playback device. For example, the memory in the information recording/playback device may be accessed via the Internet to store the recording/playback program in the memory in the information recording/playback device. Alternatively, the information recording/playback device may play back an information recording medium on which information of the recording/playback program is recorded, and the recording/playback program may be stored in the memory in the information recording/playback device.

As described above, a recording state evaluation method of the present embodiment is a recording state evaluation method of a recording medium 1 configured to optically perform information recording. The recording state evaluation method includes a step of forming a recording mark on the recording medium 1 by a predetermined recording signal; a step of obtaining a playback signal of the recording mark formed on the recording medium 1; a step of generating an expected value signal of the playback signal based on the recording signal; and a step of, based on an amplitude error between the playback signal and the expected value signal, for each predetermined unit of the recording signal, calculating a deviation amount of a mark shape of a recording mark from which the playback signal is obtained with respect to a mark shape of an ideal recording mark from which a playback signal having no amplitude error can be obtained, and estimating a mark shape of a recording mark formed on the recording medium 1. Accordingly, a recording state can be accurately evaluated based on an estimation result of the mark shape. Therefore, a delicate shape of the recording mark can be accurately estimated. In the high-density recording or the multi-value recording, it is possible to appropriately evaluate a recording state as compared with a method in the related art such as a method using the edge shift.

In the recording state evaluation method of the present embodiment, in the step of estimating the mark shape, a mark level that is a parameter representing a mark shape of the recording mark is defined, a mark level, at which an amplitude error between an expected value signal and the playback signal when a level of the recording signal is shifted is equal to or smaller than a predetermined value, is obtained, and a deviation amount of a mark shape of the recording mark is calculated based on a difference between a mark level at this time and a mark level of the ideal recording mark. Accordingly, the mark shape of the recording mark can be appropriately estimated by using the mark level.

In the recording state evaluation method of the present embodiment, in the step of estimating the mark shape, a level estimation vector of a predetermined number of elements is defined as a parameter indicating a deviation amount of a mark shape of the recording mark, an amplitude error between the playback signal and the expected value signal when a level of the recording signal is shifted is obtained by using a level estimation vector level-shifted for each predetermined unit of the recording signal, and a level estimation vector indicating a deviation amount of a mark shape from the ideal recording mark is calculated based on the amplitude error. Accordingly, the mark shape of the recording mark can be appropriately estimated by using the level estimation vector.

In the recording state evaluation method of the present embodiment, in the step of estimating the mark shape, the level estimation vector has the number of elements corresponding to a N number of patterns of a predetermined recording signal used for recording, and an element of a level estimation vector corresponding to a pattern of the recording signal is level-shifted by a predetermined amount, the level-shifted level estimation vector is added to the recording signal to calculate an expected value signal during the level shift, and the amplitude error between the expected value signal and the playback signal is obtained. Accordingly, the element of the level estimation vector is level-shifted by a predetermined amount for each pattern of the recording signal, and the amplitude error between the expected value signal and the playback signal during the level shift is obtained, so that a deviation amount of a current mark shape from an ideal shape can be obtained by an amount of the level shift when the amplitude error is zero.

In the recording state evaluation method of the present embodiment, in the step of estimating the mark shape, the level estimation vector has an initial value set to all elements 0, an element of a level estimation vector corresponding to an i-th pattern (i is an integer of 1 to N) of the recording signal is level-shifted by a predetermined amount in a positive direction and a negative direction respectively, the level-shifted level estimation vector is added to the recording signal respectively to calculate expected value signals during the level shift in each of the positive direction and the negative direction, amplitude errors between the playback signal and the expected value signals during the level shift in each of the positive direction and the negative direction are obtained, and a difference between the amplitude errors due to level shifts in both the positive direction and the negative direction is obtained, so that amplitude error sensitivity of an N number of elements indicating a slope of an amplitude error change is calculated, and a level estimation vector when the amplitude error sensitivity of the N number of elements is equal to or smaller than a predetermined value is output as a level estimation vector indicating the deviation amount of the mark shape from the ideal recording mark. Accordingly, the deviation amount from the ideal mark shape can be appropriately obtained by calculating the level estimation vector from a current state until the amplitude error sensitivity is equal to or smaller than a predetermined value.

In the recording state evaluation method of the present embodiment, in the step of estimating the mark shape, when the amplitude error sensitivity of the N number of elements is larger than a predetermined value, the amplitude error sensitivity is multiplied by a predetermined update coefficient and a result of the multiplication is added to a current level estimation vector to update the level estimation vector, and calculation of the amplitude error sensitivity when the level shift is performed in both the positive direction and the negative direction is repeatedly executed until the amplitude error sensitivity of the N number of elements is equal to or smaller than a predetermined value. Accordingly, it is possible to appropriately calculate the level estimation vector from a current state until the amplitude error sensitivity is equal to or smaller than a predetermined value.

A recording state evaluation method of the present embodiment includes: a recording step of generating a first recording signal having a length L, which is a signal sequence of two or more types of predetermined level values, and of forming a plurality of types of different first recording marks corresponding to the first recording signal on the recording medium; a playback step of obtaining a playback signal of the first recording marks formed on the recording medium; and a mark level estimation step of setting a recording state where the playback signal is equal to a first expected value obtained by a convolution calculation of the first recording signal and a predetermined impulse response as a second recording mark, and of calculating a first level estimation vector in which a deviation amount between a mark shape of the first recording mark and a mark shape of the second recording mark is represented by N types of arrangement patterns having a length M (the length M is smaller than the length L), which is a signal sequence of the two or more types of level values. The mark level estimation step includes a level-shifting step of shifting a level of an i-th arrangement pattern (i is an integer of 1 to N) of the first level estimation vector by a predetermined amount $\Delta$ in each of a positive direction and a negative direction, a recording signal generation step of adding a second level estimation vector level-shifted in the positive direction to the first recording signal to generate a second recording signal having a predetermined length L, and of similarly adding a third level estimation vector level-shifted in the negative direction to the first recording signal to generate a third recording signal having the predetermined length L, an expected value generation step of generating a second expected value signal and a third expected value signal by convoluting the impulse response with the second recording signal and convolving the impulse response with the third recording signal, a square error calculation step of calculating a second square error by squaring an error between the second expected value signal and the playback signal corresponding to the second expected value signal and integrating the squared error by a length L and of calculating a third square error by squaring an error between the third expected value signal and the playback signal corresponding to the third expected value signal and integrating the squared error by the length L, an error sensitivity calculation step of calculating error sensitivity of an i-th arrangement pattern, and calculating error sensitivity of all patterns of an arrangement pattern of i=1 to N, by obtaining a difference between the second square error and the third square error, a threshold determination step of determining whether there is a pattern that exceeds a predetermined threshold in the error sensitivity of the all patterns, and a level estimation vector update step of, when there is the pattern that exceeds the predetermined threshold in the threshold determination step, multiplying the amplitude error sensitivity of all patterns by a predetermined coefficient k such that an absolute value after the multiplication is 0.5 or less and adding a result of the multiplication to the first level estimation vector, and of returning to the level-shifting step after updating the first level estimation vector. A predetermined amount $\Delta$ of a level shift in the level-shifting step may be 0.3 or less. In the mark level estimation step, an initial value of the first level estimation vector is set to all elements 0, and a processing is repeatedly performed until the error sensitivity of all patterns is equal to or smaller than a predetermined threshold, so that a deviation amount between a mark shape of the first recording marks recorded on the recording medium and a mark shape of the second recording mark is estimated.

A recording compensation method of the present embodiment is a recording compensation method of an information recording/playback device 100 configured to optically perform information recording on a recording medium 1. The recording compensation method includes: a step of forming a recording mark on the recording medium 1 by a predetermined recording signal; a step of obtaining a playback signal of the recording mark formed on the recording medium 1; a step of generating an expected value signal of the playback signal based on the recording signal; a step of, based on an amplitude error between the playback signal and the expected value signal, for each predetermined unit of the recording signal, calculating a deviation amount of a mark shape of a recording mark from which the playback signal is obtained with respect to a mark shape of an ideal recording mark from which a playback signal having no amplitude error can be obtained, and estimating a mark shape of a recording mark formed on the recording medium 1; and a step of, based on the deviation amount of the mark shape of the recording mark, calculating a correction amount for each predetermined unit of the recording signal and adjusting a level of the recording signal. Accordingly, it is possible to accurately estimate a delicate shape of the recording mark, and for example, in the high-density recording or the multi-value recording, it is possible to obtain recording compensation performance superior to that in the related art and obtain high playback performance.

In the recording compensation method of the present embodiment, in the step of estimating the mark shape, a mark level that is a parameter representing a mark shape of the recording mark is defined, a mark level at which an amplitude error between an expected value signal and the playback signal when a level of the recording signal is shifted is equal to or smaller than a predetermined value is obtained, and a deviation amount of a mark shape of the recording mark is calculated based on a difference between a mark level at this time and a mark level of the ideal recording mark, and in the step of adjusting the level of the recording signal, the correction amount is calculated and the level of the recording signal is adjusted, based on the difference from the mark level of the ideal recording mark. Accordingly, the mark shape of the recording mark can be appropriately estimated by using the mark level, and more accurate recording compensation can be performed, so that high recording compensation performance can be obtained.

In the recording compensation method of the present embodiment, in the step of estimating the mark shape, a level estimation vector of a predetermined number of elements is defined as a parameter indicating a deviation amount of a mark shape of the recording mark, an amplitude error between the playback signal and the expected value signal when a level of the recording signal is shifted is obtained by using a level estimation vector level-shifted for each predetermined unit of the recording signal, and a level estimation vector indicating a deviation amount of a mark shape from the ideal recording mark is calculated based on the amplitude error, and in the step of adjusting the level of the recording signal, the correction amount is calculated and the level of the recording signal is adjusted, based on the level estimation vector indicating the deviation amount of the mark shape from the ideal recording mark. Accordingly, the mark shape of the recording mark can be appropriately estimated by using the level estimation vector, and more accurate recording compensation can be performed, so that high recording compensation performance can be obtained.

In the recording compensation method of the present embodiment, in the step of adjusting the level of the recording signal, when the calculated level estimation vector is larger than a predetermined value, the level estimation vector is added to a current recording signal to update the recording signal, and calculation of the level estimation vector is repeatedly executed until the level estimation vector calculated by an updated recording signal is equal to or smaller than a predetermined value. Accordingly, the level estimation vector from a current state until the amplitude error sensitivity is equal to or smaller than a predetermined value can be appropriately calculated, and the level of the recording signal can be adjusted with high accuracy.

In the recording compensation method of the present embodiment, in the step of estimating the mark shape, the level estimation vector has the number of elements corresponding to the N number of patterns of the predetermined recording signal used for recording, and has an initial value set to all elements 0, an element of a level estimation vector corresponding to an i-th pattern (i is an integer of 1 to N) of the recording signal is level-shifted by a predetermined amount in a positive direction and a negative direction respectively, the level-shifted level estimation vector is added to the recording signal respectively to calculate expected value signals during the level shift in each of the positive direction and the negative direction, amplitude errors between the playback signal and the expected value signals during the level shift in each of the positive direction and the negative direction are obtained, and a difference between the amplitude errors due to level shifts in both the positive direction and the negative direction is obtained, so that amplitude error sensitivity of an N number of elements indicating a slope of an amplitude error change is calculated, and a level estimation vector when the amplitude error sensitivity of the N number of elements is equal to or smaller than a predetermined value is output as a level estimation vector indicating a deviation amount of a mark shape from the ideal recording mark, and in the step of adjusting the level of the recording signal, when the calculated level estimation vector is larger than a predetermined value, the level estimation vector is added to a current recording signal to update the recording signal, and calculation of the level estimation vector is repeatedly executed until the level estimation vector calculated by an updated recording signal is equal to or smaller than a predetermined value. Accordingly, the level estimation vector from a current state until the amplitude error sensitivity is equal to or smaller than a predetermined value can be appropriately calculated, and the deviation amount from the ideal mark shape can be accurately estimated, so that high-precision recording compensation can be executed.

An information recording/playback device of the present embodiment is an information recording/playback device 100 configured to optically perform information recording on a recording medium 1, and includes a recording unit 103 configured to form a recording mark on the recording medium 1 by a predetermined recording signal; and a playback unit 101 configured to obtain a playback signal of the recording mark formed on the recording medium 1. Further, the information recording/playback device further includes a recording compensation unit 102. The recording compensation unit 102 has functions including: an expected value signal generation unit configured to generate an expected value signal of the playback signal based on the recording signal, and a recording state evaluation unit configured to, based on an amplitude error between the playback signal and the expected value signal, for each predetermined unit of the recording signal, calculate a deviation amount of a mark shape of a recording mark from which the playback signal is obtained with respect to a mark shape of an ideal recording mark from which a playback signal having no amplitude error can be obtained, and estimate a mark shape of a recording mark formed on the recording medium. These functions are implemented in the information recording control unit 15. Accordingly, a recording state can be accurately evaluated based on an estimation result of the mark shape. Therefore, a delicate shape of the recording mark can be accurately estimated. In the high-density recording or the multi-value recording, it is possible to appropriately evaluate a recording state as compared with a method in the related art such as a method using the edge shift.

In the information recording/playback device of the present embodiment, the information recording control unit 15 of the recording compensation unit 102 has a function of a recording compensation unit configured to, based on the calculated deviation amount of the mark shape of the recording mark, calculate a correction amount for each predetermined unit of the recording signal, and adjust a level of the recording signal. Accordingly, the mark shape of the recording mark can be appropriately estimated and the level of the recording signal can be adjusted with high accuracy. Therefore, for example, in the high-density recording or the multi-value recording, it is possible to obtain recording compensation performance superior to that in the related art and obtain high playback performance.

Various embodiments have been described above with reference to the drawings, but the invention is not limited to these embodiments. For example, the present invention is not limited to recording in which marks and spaces are alternately arranged, and can be applied to recording in which marks are continuously arranged without spaces. It will be apparent to those skilled in the art that various changes and modifications may be conceived within the scope of the claims. It is also understood that the various changes and modifications belong to the technical scope of the present invention. Further, constituent elements in the embodiments described above may be combined freely within a range not departing from the spirit of the present invention.

The present disclosure is useful as a recording state evaluation method, a recording compensation method, and an information recording/playback device that can obtain recording compensation performance superior to that in the related art and obtain high playback performance. For example, the present invention is applicable to the information recording/playback device such as a recorder using an optical disc device or a data storage device.

What is claimed is:

1. A recording state evaluation method of a recording medium configured to optically perform information recording, the recording state evaluation method comprising:

a step of forming a recording mark on the recording medium by a predetermined recording signal;

a step of obtaining a playback signal of the recording mark formed on the recording medium;

a step of generating an expected value signal of the playback signal based on the recording signal; and a step of, based on an amplitude error between the playback signal and the expected value signal, for each predetermined unit of the recording signal, calculating a deviation amount of a mark shape of a recording mark from which the playback signal is obtained with respect to a mark shape of an ideal recording mark from which a playback signal having no amplitude error can be obtained, and estimating a mark shape of the recording mark formed on the recording medium, wherein in the step of estimating the mark shape, a level estimation vector of a predetermined number of elements is defined as a parameter indicating a deviation amount of a mark shape of the recording mark, an amplitude error between the playback signal and the expected value signal when a level of the recording signal is shifted is obtained by using a level estimation vector level-shifted for each predetermined unit of the recording signal, and a level estimation vector indicating a deviation amount of a mark shape from the ideal recording mark is calculated based on the amplitude error.

2. The recording state evaluation method according to claim 1, wherein in the step of estimating the mark shape, the level estimation vector has the number of elements corresponding to a N number of patterns of a predetermined recording signal used for recording, and an element of a level estimation vector corresponding to the patterns is level-shifted by a predetermined amount, the level-shifted level estimation vector is added to the recording signal to calculate an expected value signal during the level shift, and the amplitude error between the expected value signal and the playback signal is obtained.

3. The recording state evaluation method according to claim 2, wherein in the step of estimating the mark shape, the level estimation vector has an initial value set to all elements 0, an element of a level estimation vector corresponding to an i-th pattern (i is an integer of 1 to N) is level-shifted by a predetermined amount in a positive direction and a negative direction respectively, the level-shifted level estimation vectors are added to the recording signal respectively to calculate expected value signals during the level shift in each of the positive direction and the negative direction, amplitude errors between the playback signal and the expected value signals during the level shift in each of the positive direction and the negative direction are obtained, and a difference between the amplitude errors due to level shifts in both the positive direction and the negative direction is obtained, so that amplitude error sensitivity of an N number of elements indicating a slope of an amplitude error change is calculated, and a level estimation vector when the amplitude error sensitivity of the N number of elements is equal to or smaller than a predetermined value is output as a level estimation vector indicating the deviation amount of the mark shape from the ideal recording mark.

4. The recording state evaluation method according to claim 3, wherein in the step of estimating the mark shape, when the amplitude error sensitivity of the N number of elements is larger than a predetermined value, the amplitude error sensitivity is multiplied by a predetermined update coefficient and a result of the multiplication is added to a current level estimation vector to update the level estimation vector, and calculation of the amplitude error sensitivity when the level shift is performed in both the positive direction and the negative direction is repeatedly executed until the amplitude error sensitivity of the N number of elements is equal to or smaller than a predetermined value.

5. A recording state evaluation method of a recording medium configured to optically perform information recording, the recording state evaluation method comprising:

a recording step of generating a first recording signal having a length L, which is a signal sequence of two or more types of predetermined level values, and of forming a plurality of types of different first recording marks corresponding to the first recording signal on the recording medium;

a playback step of obtaining a playback signal of the first recording marks formed on the recording medium; and a mark level estimation step of setting a recording state where the playback signal is equal to a first expected value obtained by a convolution calculation of the first recording signal and a predetermined impulse response as a second recording mark, and of calculating a first level estimation vector in which a deviation amount between a mark shape of the first recording mark and a mark shape of the second recording mark is represented by N types of arrangement patterns having a length M (the length M is smaller than the length L), which is a signal sequence of the two or more types of level values, wherein the mark level estimation step includes a level-shifting step of shifting a level of an i-th arrangement pattern (i is an integer of 1 to N) of the first level estimation vector by a predetermined amount Δ in each of a positive direction and a negative direction, a recording signal generation step of adding a second level estimation vector level-shifted in the positive direction to the first recording signal to generate a second recording signal having a predetermined length L, and of similarly adding a third level estimation vector level-shifted in the negative direction to the first recording signal to generate a third recording signal having the predetermined length L, an expected value generation step of generating a second expected value signal and a third expected value signal by convoluting the impulse response with the second recording signal and convolving the impulse response with the third recording signal, a square error calculation step of calculating a second square error by squaring an error between the second expected value signal and the playback signal corresponding to the second expected value signal and integrating the squared error by a length L and of calculating a third square error by squaring an error between the third expected value signal and the playback signal corresponding to the third expected value signal and integrating the squared error by the length L, an error sensitivity calculation step of calculating error sensitivity of an i-th arrangement pattern, and calculating error sensitivity of all patterns of an arrangement pattern of i=1 to N, by obtaining a difference between the second square error and the third square error, a threshold determination step of determining whether there is a pattern that exceeds a predetermined threshold in the error sensitivity of all patterns, and a level estimation vector update step of, when there is the pattern that exceeds the predetermined threshold in the threshold determination step, multiplying the amplitude error sensitivity of all patterns by a predetermined coefficient k such that an absolute value after the multiplication is 0.5 or less and adding a result of the multiplication to the first level estimation vector, and of returning to the level-shifting step after updating the first level estimation vector, and wherein in the mark level estimation step, an initial value of the first level estimation vector is set to all elements 0, and a processing is repeatedly performed until the error sensitivity of all patterns is equal to or smaller than a predetermined threshold, so that a deviation amount between a mark shape of the first recording mark recorded on the recording medium and a mark shape of the second recording mark is estimated.

6. The recording state evaluation method according to claim 5, wherein
a predetermined amount Δ of a level shift in the level-shifting step is 0.3 or less.

7. A recording compensation method of an information recording/playback device configured to optically perform information recording on a recording medium, the recording compensation method comprising:
a step of forming a recording mark on the recording medium by a predetermined recording signal;
a step of obtaining a playback signal of the recording mark formed on the recording medium;
a step of generating an expected value signal of the playback signal based on the recording signal;
a step of, based on an amplitude error between the playback signal and the expected value signal, for each predetermined unit of the recording signal, calculating a deviation amount of a mark shape of a recording mark from which the playback signal is obtained with respect to a mark shape of an ideal recording mark from which a playback signal having no amplitude error can be obtained, and estimating a mark shape of the recording mark formed on the recording medium; and
a step of, based on the deviation amount of the mark shape of the recording mark, calculating a correction amount for each predetermined unit of the recording signal and adjusting a level of the recording signal, wherein
in the step of estimating the mark shape,
a level estimation vector of a predetermined number of elements is defined as a parameter indicating a deviation amount of a mark shape of the recording mark, an amplitude error between the playback signal and the expected value signal when a level of the recording signal is shifted is obtained by using a level estimation vector level-shifted for each predetermined unit of the recording signal, and a level estimation vector indicating a deviation amount of a mark shape from the ideal recording mark is calculated based on the amplitude error, and
in the step of adjusting the level of the recording signal, the correction amount is calculated and the level of the recording signal is adjusted, based on the level estimation vector indicating the deviation amount of the mark shape from the ideal recording mark.

8. The recording compensation method according to claim 7, wherein
in the step of adjusting the level of the recording signal, when the calculated level estimation vector is larger than a predetermined value, the level estimation vector is added to a current recording signal to update the recording signal, and calculation of the level estimation vector is repeatedly executed until the level estimation vector calculated by an updated recording signal is equal to or smaller than a predetermined value.

9. The recording compensation method according to claim 7, wherein
in the step of estimating the mark shape,
the level estimation vector has the number of elements corresponding to the N number of patterns of the predetermined recording signal used for recording, and has an initial value set to all elements 0,
an element of a level estimation vector corresponding to an i-th pattern (i is an integer of 1 to N) is level-shifted by a predetermined amount in a positive direction and a negative direction respectively, the level-shifted level estimation vectors are added to the recording signal respectively to calculate expected value signals during the level shift in each of the positive direction and the negative direction, amplitude errors between the playback signal and the expected value signals during the level shift in each of the positive direction and the negative direction are obtained, and a difference between the amplitude errors due to level shifts in both the positive direction and the negative direction is obtained, so that amplitude error sensitivity of an N number of elements indicating a slope of an amplitude error change is calculated, and
a level estimation vector when the amplitude error sensitivity of the N number of elements is equal to or smaller than a predetermined value is output as a level estimation vector indicating a deviation amount of a mark shape from the ideal recording mark, and
in the step of adjusting the level of the recording signal, when the calculated level estimation vector is larger than a predetermined value, the level estimation vector is added to a current recording signal to update the recording signal, and calculation of the level estimation vector is repeatedly executed until the level estimation vector calculated by an updated recording signal is equal to or smaller than a predetermined value.

* * * * *